(12) United States Patent  (10) Patent No.: US 7,911,515 B2
Ito et al.  (45) Date of Patent: Mar. 22, 2011

(54) IMAGING APPARATUS AND METHOD OF PROCESSING VIDEO SIGNAL

(75) Inventors: Taiichi Ito, Kanagawa-ken (JP); Toshihide Kobayashi, Kanagawa-ken (JP); Kazuya Yamada, Kanagawa-ken (JP)

(73) Assignee: Victor Company of Japan, Ltd., Yokohama (JP)

( * ) Notice: Subject to any disclaimer, the term of this patent is extended or adjusted under 35 U.S.C. 154(b) by 550 days.

(21) Appl. No.: 12/078,919

(22) Filed: Apr. 8, 2008

(65) Prior Publication Data

US 2009/0079855 A1    Mar. 26, 2009

(30) Foreign Application Priority Data

Sep. 20, 2007 (JP) ................................. 2007-244203

(51) Int. Cl.
H04N 5/225 (2006.01)
H04N 9/093 (2006.01)
(52) U.S. Cl. ........................................ 348/262; 348/263
(58) Field of Classification Search .................. None
See application file for complete search history.

(56) References Cited

U.S. PATENT DOCUMENTS

| | | | | |
|---|---|---|---|---|
| 4,285,004 A | * | 8/1981 | Morrison et al. | 348/176 |
| 4,334,238 A | * | 6/1982 | Morishita et al. | 348/265 |
| 4,725,881 A | * | 2/1988 | Buchwald | 348/237 |
| 5,471,323 A | * | 11/1995 | Suetsugi et al. | 358/511 |
| 5,521,637 A | * | 5/1996 | Asaida et al. | 348/222.1 |
| 5,657,082 A | * | 8/1997 | Harada et al. | 348/262 |
| 5,754,226 A | * | 5/1998 | Yamada et al. | 348/219.1 |
| 7,570,286 B2 | * | 8/2009 | Koike et al. | 348/235 |
| 7,825,968 B2 | * | 11/2010 | Azuma et al. | 348/262 |

FOREIGN PATENT DOCUMENTS

| | | |
|---|---|---|
| JP | 10-155158 | 6/1998 |
| JP | 11-234690 | 8/1999 |
| JP | 2000-341708 | 12/2000 |
| JP | 2000-341710 | 12/2000 |

* cited by examiner

*Primary Examiner* — Justin P Misleh
(74) *Attorney, Agent, or Firm* — Louis Woo

(57) ABSTRACT

Calculation is made about standard deviations of portions of high-frequency components GH, RH, and BH along respective predetermined directions. The portions of the high-frequency components GH, RH, and BH represent a prescribed number of pixels including an interpolation pixel located at a position corresponding to none of photosensor pixels in G, R, and B image sensors. The smallest one is detected among the calculated standard deviations. The predetermined direction relating to the detected smallest standard deviation is labeled as a highest-correlation direction in which the highest correlation occurs. Interpolation is implemented in response to portions of the high-frequency components GH, RH, and BH which correspond to the highest-correlation direction to generate a high-frequency interpolation-result signal RGBHI for the interpolation pixel and other pixels. Low-frequency components GL, RL, and BL are combined with the high-frequency interpolation-result signal RGBHI to generate high-definition green, red, and blue signals G(HD), R(HD), and B(HD).

5 Claims, 14 Drawing Sheets

FIG. 10
PRIOR ART

|   | | 2j | 2j+1 | | |
|---|---|---|---|---|---|
| | G | R | G | R | G | R |
| | B | G | B | G | B | G |
| 2i | G | R | G | R | G | R |
| 2i+1 | B | G | B | G | B | G |
| | G | R | G | R | G | R |
| | B | G | B | G | B | G |

FIG. 11
PRIOR ART

|   | 0 | 1 | 2 | 3 | 4 | 5 |
|---|---|---|---|---|---|---|
| 0 | G | | G | | G | |
| 1 | | R/B | | R/B | | R/B |
| 2 | G | | G | | G | |
| 3 | | R/B | | R/B | | R/B |
| 4 | G | | G | | G | |
| 5 | | R/B | | R/B | | R/G |

FIG. 18

| G | 0 | G | 0 | G | 0 | G | 0 |
|---|---|---|---|---|---|---|---|
| 0 | 0 | 0 | 0 | 0 | 0 | 0 | 0 |
| G | 0 | G | 0 | G | 0 | G | 0 |
| 0 | 0 | 0 | 0 | 0 | 0 | 0 | 0 |
| G | 0 | G | 0 | G | 0 | G | 0 |
| 0 | 0 | 0 | 0 | 0 | 0 | 0 | 0 |
| G | 0 | G | 0 | G | 0 | G | 0 |
| 0 | 0 | 0 | 0 | 0 | 0 | 0 | 0 |

FIG. 19

| 0 | 0 | 0 | 0 | 0 | 0 | 0 | 0 |
|---|---|---|---|---|---|---|---|
| R | 0 | R | 0 | R | 0 | R | 0 |
| 0 | 0 | 0 | 0 | 0 | 0 | 0 | 0 |
| R | 0 | R | 0 | R | 0 | R | 0 |
| 0 | 0 | 0 | 0 | 0 | 0 | 0 | 0 |
| R | 0 | R | 0 | R | 0 | R | 0 |
| 0 | 0 | 0 | 0 | 0 | 0 | 0 | 0 |
| R | 0 | R | 0 | R | 0 | R | 0 |

FIG. 20

| 0 | B | 0 | B | 0 | B | 0 | B |
|---|---|---|---|---|---|---|---|
| 0 | 0 | 0 | 0 | 0 | 0 | 0 | 0 |
| 0 | B | 0 | B | 0 | B | 0 | B |
| 0 | 0 | 0 | 0 | 0 | 0 | 0 | 0 |
| 0 | B | 0 | B | 0 | B | 0 | B |
| 0 | 0 | 0 | 0 | 0 | 0 | 0 | 0 |
| 0 | B | 0 | B | 0 | B | 0 | B |
| 0 | 0 | 0 | 0 | 0 | 0 | 0 | 0 |

FIG. 26

|   | (i-3) | (i-2) | (i-1) | i | (i+1) | (i+2) | (i+3) | (i+4) |
|---|---|---|---|---|---|---|---|---|
| (j-3) | GH | BH | GH | BH | GH | BH | GH | BH |
| (j-2) | RH | NON | RH | NON | RH | NON | RH | NON |
| (j-1) | GH | BH | GH | BH | GH | BH | GH | BH |
| j | RH | NON | RH | NON | RH | NON | RH | NON |
| (j+1) | GH | BH | GH | BH | GH | BH | GH | BH |
| (j+2) | RH | NON | RH | NON | RH | NON | RH | NON |
| (j+3) | GH | BH | GH | BH | GH | BH | GH | BH |
| (j+4) | RH | NON | RH | NON | RH | NON | RH | NON |

IMAGING APPARATUS AND METHOD OF PROCESSING VIDEO SIGNAL

BACKGROUND OF THE INVENTION

1. Field of the Invention

This invention generally relates to an imaging apparatus such as a video camera, and particularly relates to an imaging apparatus including solid-state image sensors and a section for processing video signals outputted from the image sensors to attain a high video definition. In addition, this invention relates to a method of processing video signals to attain a high video definition.

2. Description of the Related Art

Japanese patent application publication number 2000-341708 discloses an imaging apparatus including a lens, a prism, and solid-state image sensors for R, G, and B (red, green, and blue). An incident light beam passes through the lens before reaching the prism. The incident light beam is separated by the prism into R, G, and B light beams applied to the R, G, and B image sensors respectively. The R, G, and B light beams are converted by the R, G, and B image sensors into R, G, and B signals, respectively. Each of the R, G, and B image sensors has a matrix array of 640 photosensor pixels in a horizontal direction and 480 photosensor pixels in a vertical direction. The matrix array of the photosensor pixels has a predetermined horizontal pixel pitch and a predetermined vertical pixel pitch.

In the imaging apparatus of Japanese application 2000-341708, the optical position of the R and B image sensors relative to the incident light beam slightly differs from that of the G image sensor such that the photosensor pixels in the R, G, and B image sensors are staggered at horizontal intervals equal to half the horizontal pixel pitch and vertical intervals equal to half the vertical pixel pitch. The R, G, and B signals outputted from the R, G, and B image sensors are processed, through interpolation, into component video signals representing a periodically-updated frame composed of 1280 pixels in a horizontal direction and 720 pixels in a vertical direction.

Japanese patent application publication number 2000-341710 discloses an imaging apparatus including a lens, a prism, and solid-state image sensors for R, G1, G2, and B (red, first green, second green, and blue). An incident light beam passes through the lens before reaching the prism. The incident light beam is separated by the prism into R, G1, G2, and B light beams applied to the R, G1, G2, and B image sensors respectively. The R, G1, G2, and B light beams are converted by the R, G1, G2, and B image sensors into R, G1, G2, and B signals, respectively. Each of the R, G1, G2, and B image sensors has a matrix array of 640 photosensor pixels in a horizontal direction and 480 photosensor pixels in a vertical direction. The matrix array of the photosensor pixels has a predetermined horizontal pixel pitch and a predetermined vertical pixel pitch.

In the imaging apparatus of Japanese application 2000-341710, the optical position of the G2 image sensor relative to the incident light beam slightly differs from that of the G1 image sensor such that the photosensor pixels in the G1 and G2 image sensors are staggered at horizontal intervals equal to half the horizontal pixel pitch and vertical intervals equal to half the vertical pixel pitch. The optical position of the R image sensor relative to the incident light beam slightly differs from that of the G1 image sensor such that the photosensor pixels in the R and G1 image sensors are staggered at horizontal intervals equal to half the horizontal pixel pitch. The optical position of the B image sensor relative to the incident light beam slightly differs from that of the G1 image sensor such that the photosensor pixels in the B and G1 image sensors are staggered at vertical intervals equal to half the vertical pixel pitch. The R, G1, G2, and B signals outputted from the R, G1, G2, and B image sensors are processed, through interpolation, into component video signals representing a periodically-updated frame composed of 1280 pixels in a horizontal direction and 960 pixels in a vertical direction.

Japanese patent application publication number 11-234690/1999 discloses an imaging apparatus including two image sensors each having a matrix array of photosensor pixels. The positions of the two image sensors slightly differ such that the pixel array in one of the two image sensors is obliquely shifted from that in the other image sensor by a distance corresponding to half a pixel in a horizontal direction and a distance corresponding to a half a pixel in a vertical direction. For every frame, a set of output signals from the two image sensors is composed of only first signal segments representing first alternate ones of pixels forming one high-definition frame. Second signal segments representing second alternate ones of pixels forming one high-definition frame are generated from the first signal segments through interpolation depending on the direction of a high video correlation. Specifically, the degree and direction of each of video correlations at and around a pixel of interest are detected. In the presence of a high video correlation along a horizontal direction, a second signal segment representing a pixel of interest is generated from first signal segments representing left and right pixels neighboring the pixel of interest. In the presence of a high video correlation along a vertical direction, a second signal segment representing a pixel of interest is generated from first signal segments representing upper and lower pixels neighboring the pixel of interest. In the absence of such high horizontal and vertical video correlations, a second signal segment representing a pixel of interest is generated from first signal segments representing left, right, upper, and lower pixels neighboring the pixel of interest.

Japanese patent application publication number 10-155158/1998 discloses an imaging apparatus similar to that in Japanese application 11-234690/1999 except for the following points. In the apparatus of Japanese application 10-155158/1998, not only horizontal and vertical video correlations but also oblique video correlations can be detected. In the presence of a high video correlation in a left-upper to right-lower direction, a signal segment representing a pixel of interest is generated from signal segments representing left-upper and right-lower pixels neighboring the pixel of interest. In the presence of a high video correlation along a left-lower to right-upper direction, a signal segment representing a pixel of interest is generated from signal segments representing left-lower and right-upper pixels neighboring the pixel of interest.

SUMMARY OF THE INVENTION

It is a first object of this invention to provide an imaging apparatus which can accurately detect a video correlation and thus implement reliable interpolation for generating a high-definition video signal.

It is a second object of this invention to provide a method of processing a video signal which can accurately detect a video correlation and thus implement reliable interpolation.

A first aspect of this invention provides an imaging apparatus comprising a color-separation optical system for separating incident light into green, red, and blue light beams; a first solid-state image sensor receiving the green light beam from the color-separation optical system and including a plurality of photosensor pixels arranged at prescribed pixel pitches along horizontal and vertical directions, the first solid-state image sensor changing the received green light beam into an analog G signal through photoelectric conversion implemented by the photosensor pixels therein; a second solid-state image sensor receiving the red light beam from the color-separation optical system and including a plurality of photosensor pixels, the second solid-state image sensor changing the received red light beam into an analog R signal through photoelectric conversion implemented by the photosensor pixels therein, wherein the photosensor pixels in the second solid-state image sensor are different in optical position from the photosensor pixels in the first solid-state image sensor by a distance corresponding to half the prescribed pixel pitch along at least one of the horizontal and vertical directions; a third solid-state image sensor receiving the blue light beam from the color-separation optical system and including a plurality of photosensor pixels, the third solid-state image sensor changing the received blue light beam into an analog B signal through photoelectric conversion implemented by the photosensor pixels therein, wherein the photosensor pixels in the third solid-state image sensor are different in optical position from the photosensor pixels in the first solid-state image sensor by a distance corresponding to half the prescribed pixel pitch along at least one of the horizontal and vertical directions, and wherein the optical positions of the photosensor pixels in the third solid-state image sensor are out of overlap with the optical positions of the photosensor pixels in the second solid-state image sensor; first means for converting the analog G, R, and B signals generated by the first, second, and third solid-state image sensors into digital G, R, and B signals, respectively; second means for implementing two-dimensional interpolation in response to the digital G signal to generate signal segments representing pixels between pixels represented by the digital G signal, and thereby converting the digital G signal into an interpolation-result signal GI; third means for implementing two-dimensional interpolation in response to the digital R signal to generate signal segments representing pixels between pixels represented by the digital R signal, and thereby converting the digital R signal into an interpolation-result signal RI; fourth means for implementing two-dimensional interpolation in response to the digital B signal to generate signal segments representing pixels between pixels represented by the digital B signal, and thereby converting the digital B signal into an interpolation-result signal BI; a first two-dimensional low pass filter for extracting low-frequency components GL, which are defined in a two-dimensional space, from the interpolation-result signal GI; a second two-dimensional low pass filter for extracting low-frequency components RL, which are defined in a two-dimensional space, from the interpolation-result signal RI; a third two-dimensional low pass filter for extracting low-frequency components BL, which are defined in a two-dimensional space, from the interpolation-result signal BI; fifth means for subtracting the low-frequency components GL from the interpolation-result signal GI to generate high-frequency components GH; sixth means for subtracting the low-frequency components RL from the interpolation-result signal RI to generate high-frequency components RH; seventh means for subtracting the low-frequency components BL from the interpolation-result signal BI to generate high-frequency components BH; eighth means for calculating standard deviations of portions of the high-frequency components GH, RH, and BH along respective predetermined directions, wherein the portions of the high-frequency components GH, RH, and BH represent a prescribed number of pixels including an interpolation pixel located at a position corresponding to none of the photosensor pixels in the first, second, and third solid-state image sensors; ninth means for detecting the smallest one among the standard deviations calculated by the eighth means, and labeling the predetermined direction relating to the detected smallest standard deviation as a highest-correlation direction in which the highest correlation occurs; tenth means for implementing interpolation in response to portions of the high-frequency components GH, RH, and BH which correspond to the highest-correlation direction to generate a high-frequency interpolation-result signal RGBHI for the interpolation pixel and also other pixels; and eleventh means for combining the low-frequency components GL, RL, and BL with the high-frequency interpolation-result signal RGBHI to generate high-definition green, red, and blue signals G(HD), R(HD), and B(HD).

A second aspect of this invention is based on the first aspect thereof, and provides an imaging apparatus wherein the eighth means comprises means for calculating first, second, and third components of each of the standard deviations; and means for combining the calculated first, second, and third components to obtain each of the standard deviations; wherein the calculated first component is equal to a standard deviation of portions of the high-frequency components GH, RH, and BH which represent pixels in a first line passing through the interpolation pixel and parallel to each of the predetermined directions, wherein the calculated second component is equal to a standard deviation of portions of the high-frequency components GH, RH, and BH which represent pixels in a second line adjacent and parallel to the first line, and wherein the calculated third component is equal to a standard deviation of portions of the high-frequency components GH, RH, and BH which represent pixels in a third line adjacent and parallel to the first line.

A third aspect of this invention provides a method of processing a video signal in an imaging apparatus including a color-separation optical system and first, second, and third solid-state imaging sensors, the color-separation optical system separating incident light into green, red, and blue light beams, the first solid-state image sensor receiving the green light beam from the color-separation optical system and including a plurality of photosensor pixels arranged at prescribed pixel pitches along horizontal and vertical directions, the first solid-state image sensor changing the received green light beam into an analog G signal through photoelectric conversion implemented by the photosensor pixels therein, the second solid-state image sensor receiving the red light beam from the color-separation optical system and including a plurality of photosensor pixels, the second solid-state image sensor changing the received red light beam into an analog R signal through photoelectric conversion implemented by the photosensor pixels therein, wherein the photosensor pixels in the second solid-state image sensor are different in optical position from the photosensor pixels in the first solid-state image sensor by a distance corresponding to half the prescribed pixel pitch along at least one of the horizontal and vertical directions, the third solid-state image sensor receiving the blue light beam from the color-separation optical system and including a plurality of photosensor pixels, the third solid-state image sensor changing the received blue light beam into an analog B signal through photoelectric conversion implemented by the photosensor pixels therein, wherein the photosensor pixels in the third solid-state image sensor are different in optical position from the photosensor pixels in the first solid-state image sensor by a distance corresponding to half the prescribed pixel pitch along at least one of the horizontal and vertical directions, and wherein the optical positions of the photosensor pixels in the third solid-state image sensor are out of overlap with the optical positions of the photosensor pixels in the second solid-state image sensor. The method comprises the steps of converting the analog G, R, and B signals generated by the first, second, and third solid-state image sensors into digital G, R, and B signals, respectively; implementing two-dimensional interpolation in response to the digital G signal to generate signal segments representing pixels between pixels represented by the digital G signal, and thereby converting the digital G signal into an interpolation-result signal GI; implementing two-dimensional interpolation in response to the digital R signal to generate signal segments representing pixels between pixels represented by the digital R signal, and thereby converting the digital R signal into an interpolation-result signal RI; implementing two-dimensional interpolation in response to the digital B signal to generate signal segments representing pixels between pixels represented by the digital B signal, and thereby converting the digital B signal into an interpolation-result signal BI; extracting low-frequency components GL, which are defined in a two-dimensional space, from the interpolation-result signal GI through the use of a first two-dimensional low pass filter; extracting low-frequency components RL, which are defined in a two-dimensional space, from the interpolation-result signal RI through the use of a second two-dimensional low pass filter; extracting low-frequency components BL, which are defined in a two-dimensional space, from the interpolation-result signal BI through the use of a third two-dimensional low pass filter; subtracting the low-frequency components GL from the interpolation-result signal GI to generate high-frequency components GH; subtracting the low-frequency components RL from the interpolation-result signal RI to generate high-frequency components RH; subtracting the low-frequency components BL from the interpolation-result signal BI to generate high-frequency components BH; calculating standard deviations of portions of the high-frequency components GH, RH, and BH along respective predetermined directions, wherein the portions of the high-frequency components GH, RH, and BH represent a prescribed number of pixels including an interpolation pixel located at a position corresponding to none of the photosensor pixels in the first, second, and third solid-state image sensors; detecting the smallest one among the calculated standard deviations, and labeling the predetermined direction relating to the detected smallest standard deviation as a highest-correlation direction in which the highest correlation occurs; implementing interpolation in response to portions of the high-frequency components GH, RH, and BH which correspond to the highest-correlation direction to generate a high-frequency interpolation-result signal RGBHI for the interpolation pixel and other pixels; and combining the low-frequency components GL, RL, and BL with the high-frequency interpolation-result signal RGBHI to generate high-definition green, red, and blue signals G(HD), R(HD), and B(HD).

A fourth aspect of this invention is based on the third aspect thereof, and provides a method wherein the step of calculating the standard deviations comprises calculating first, second, and third components of each of the standard deviations; and combining the calculated first, second, and third components to obtain each of the standard deviations; wherein the calculated first component is equal to a standard deviation of portions of the high-frequency components GH, RH, and BH which represent pixels in a first line passing through the interpolation pixel and parallel to each of the predetermined directions, wherein the calculated second component is equal to a standard deviation of portions of the high-frequency components GH, RH, and BH which represent pixels in a second line adjacent and parallel to the first line, and wherein the calculated third component is equal to a standard deviation of portions of the high-frequency components GH, RH, and BH which represent pixels in a third line adjacent and parallel to the first line.

A fifth aspect of this invention provides an imaging apparatus comprising means for separating an R signal into a high-frequency-component signal RH and a low-frequency-component signal RL; means for separating a G signal into a high-frequency-component signal GH and a low-frequency-component signal GL; means for separating a B signal into a high-frequency-component signal BH and a low-frequency-component signal BL; wherein the high-frequency-component signals RH, GH, and BH are divided into portions representing respective pixels in every frame; means for calculating standard deviations of respective sets of selected ones among the portions of the high-frequency-component signals RH, GH, and BH, wherein each of the sets represents selected pixels including each prescribed pixel, and the selected pixels are in different predetermined directions related to the respective calculated standard deviations and passing the prescribed pixel; means for detecting the smallest one among the calculated standard deviations; means for identifying, among the predetermined directions, one related to the detected smallest standard deviation; means for using the high-frequency-component signals RH, GH, and BH as a high-frequency composite signal RGBHI for pixels except the prescribed pixel, selecting one from the high-frequency-component signals RH, GH, and BH in response to the identified direction, and generating a high-frequency composite signal RGBHI for the prescribed pixel in response to the selected one of the high-frequency-component signals RH, GH, and BH; and means for combining the low-frequency-component signals RL, GL, and BL with the high-frequency composite signal RGBHI for the prescribed pixel and the other pixels to generate a high-definition red, green, and blue signals R(HD), G(HD), and B(HD).

This invention has the following advantages. Three solid-state image sensors are used, and thereby a high video definition is attained which corresponds to a greater number of pixels than a pixel number in each of the three image sensors. The effect of increasing definitions along oblique directions is provided similar to the effect of increasing definitions along horizontal and vertical directions. The direction of a correlation in an image pattern is detected through the use of standard deviations, and thereby the accuracy of interpolation for high-frequency signal components can be increased. Therefore, it is possible to attain a high video definition comparable to that provided in cases where four solid-state image sensors are used.

BRIEF DESCRIPTION OF THE DRAWINGS

FIG. 10 is a diagram of a pixel array in a color filter provided in an image sensor in a third prior-art imaging apparatus.

FIG. 11 is a diagram of oblique lines and a superposition-like combination of the photosensor pixels in the image sensors in FIGS. 1, 2, and 3.

FIG. 18 is a diagram showing an array of pixel-corresponding segments of a sample-number-increased green signal generated by a horizontal-vertical interpolating section in FIG. 13.

FIG. 19 is a diagram showing an array of pixel-corresponding segments of a sample-number-increased red signal generated by the horizontal-vertical interpolating section in FIG. 13.

FIG. 20 is a diagram showing an array of pixel-corresponding segments of a sample-number-increased blue signal generated by the horizontal-vertical interpolating section in FIG. 13.

FIG. 26 is a diagram of an arrangement of pixels including not only actual pixels but also nonexistent pixels for which corresponding signal segments are generated by interpolation.

DETAILED DESCRIPTION OF THE INVENTION

Prior-art imaging apparatuses will be explained below for a better understanding of this invention.

A first prior-art imaging apparatus disclosed in Japanese patent application publication number 2000-341708 is designed so that an incident light beam is separated into G, R, and B (green, red, and blue) light beams, which are applied to G, R, and B solid-state image sensors respectively. The G image sensor has an array of photosensor pixels shown in FIG. 1 where "G" denotes the position of each photosensor pixel. The R image sensor has an array of photosensor pixels shown in FIG. 2 where "R" denotes the position of each photosensor pixel. The B image sensor has an array of photosensor pixels shown in FIG. 3 where "B" denotes the position of each photosensor pixel. In each of the G, R, and B image sensors, photosensor pixels are spaced at a pitch Px along a horizontal direction and at a pitch Py along a vertical direction.

Figure 1:
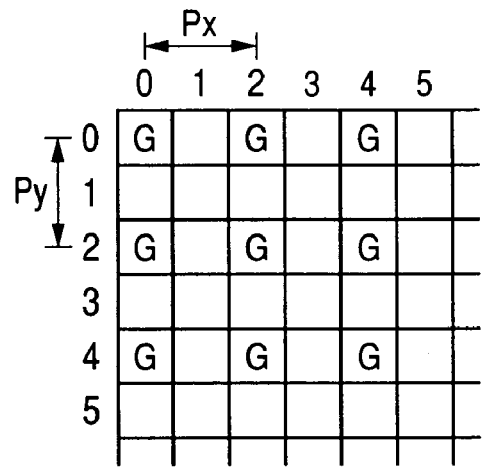
FIGS. 1, 2, and 3 are diagrams of arrays of photosensor pixels in solid-state image sensors in a first prior-art imaging apparatus.
Figure 2:
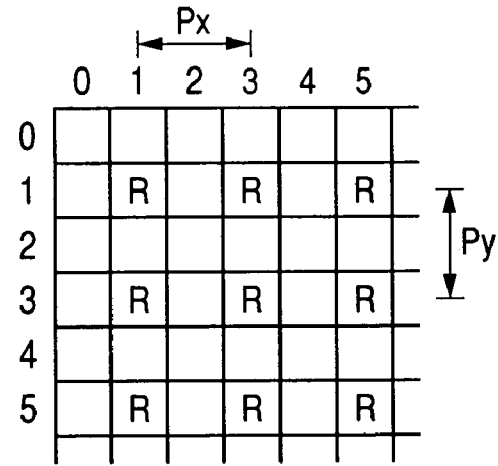
Figure 3:
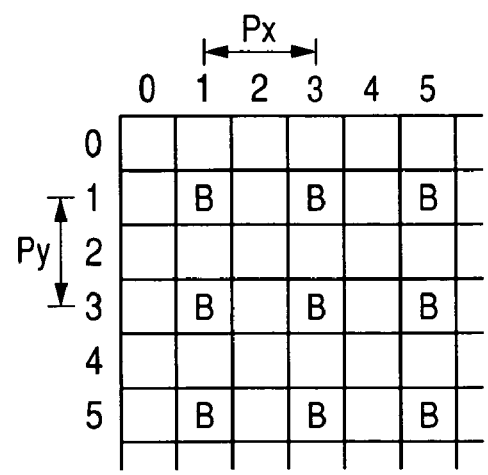
Figure 4:
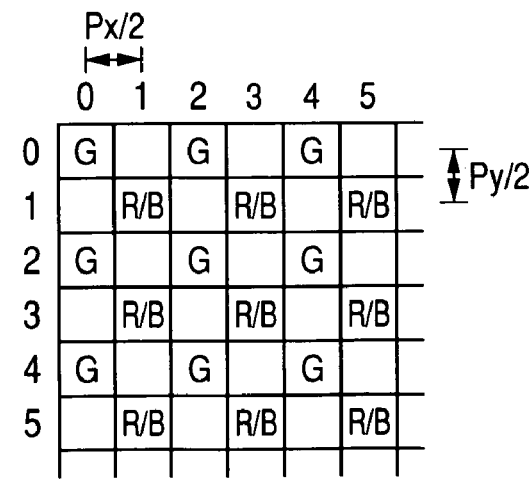
FIG. 4 is a diagram of a superposition-like combination of the photosensor pixels in the image sensors in FIGS. 1, 2, and 3.

As shown in FIGS. 1-3, the optical position of the R and B image sensors relative to the incident light beam slightly differs from that of the G image sensor such that the photosensor pixels in the G, R, and B image sensors are staggered at horizontal intervals equal to half the horizontal pixel pitch Px and vertical intervals equal to half the vertical pixel pitch Py. Accordingly, a superposition-like combination of the photosensor pixels in the G, R, and B image sensors has a configuration shown in FIG. 4. In this combination, the positions of the photosensor pixels in the R image sensor are equal to those of the photosensor pixels in the B image sensor. In the first prior-art imaging apparatus, interpolation using video signals outputted from the G, R, and B image sensors is implemented for increasing the number of effective pixels for every frame to attain a high video definition.

A second prior-art imaging apparatus disclosed in Japanese patent application publication number 2000-341710 is designed so that a G light beam is applied to first and second G image sensors while an R light beam and a B light beam are applied to an R image sensor and a B image sensor respectively. The first and second G image sensors, the R image sensor, and the B image sensor are of a solid-state type. The first G image sensor has an array of photosensor pixels shown in FIG. 5 where "G1" denotes the position of each photosensor pixel. The second G image sensor has an array of photosensor pixels shown in FIG. 6 where "G2" denotes the position of each photosensor pixel. The R image sensor has an array of photosensor pixels shown in FIG. 7 where "R" denotes the position of each photosensor pixel. The B image sensor has an array of photosensor pixels shown in FIG. 8 where "B" denotes the position of each photosensor pixel. In each of the first G, second G, R, and B image sensors, photosensor pixels are spaced at a pitch Px along a horizontal direction and at a pitch Py along a vertical direction.

Figure 5:
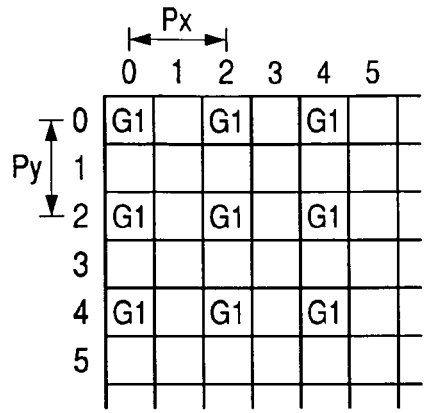
FIGS. 5, 6, 7, and 8 are diagrams of arrays of photosensor pixels in solid-state image sensors in a second prior-art imaging apparatus.
Figure 6:
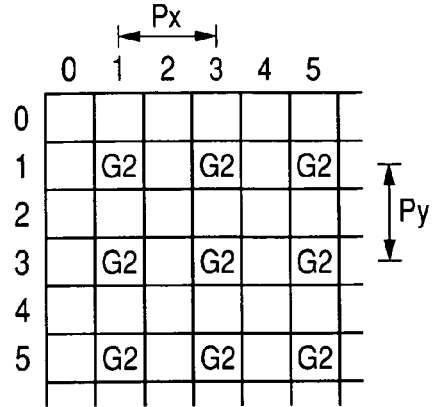
Figure 7:
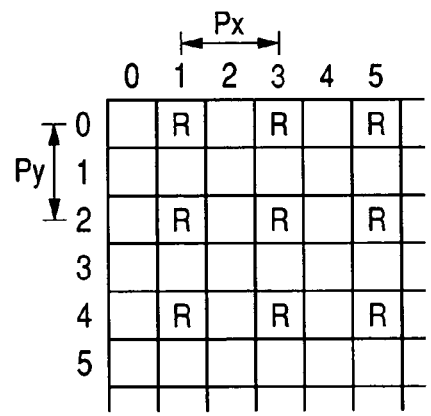
Figure 8:
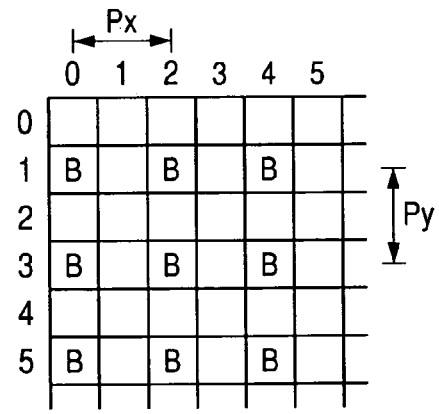
Figure 9:
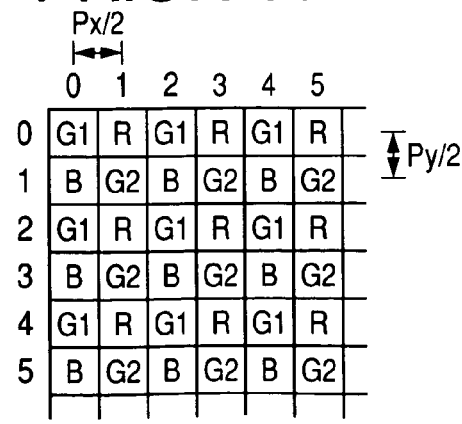
FIG. 9 is a diagram of a superposition-like combination of the photosensor pixels in the image sensors in FIGS. 5, 6, 7, and 8.

As shown in FIGS. 5 and 6, the optical position of the second G image sensor relative to the incident light beam slightly differs from that of the first G image sensor such that the photosensor pixels in the first and second G image sensors are staggered at horizontal intervals equal to half the horizontal pixel pitch Px and vertical intervals equal to half the vertical pixel pitch Py. As shown in FIGS. 5 and 7, the optical position of the R image sensor relative to the incident light beam slightly differs from that of the first G image sensor such that the photosensor pixels in the R and first G image sensors are staggered at horizontal intervals equal to half the horizontal pixel pitch Px. As shown in FIGS. 5 and 8, the optical position of the B image sensor relative to the incident light beam slightly differs from that of the first G image sensor such that the photosensor pixels in the B and first G image sensors are staggered at vertical intervals equal to half the vertical pixel pitch Py. Accordingly, a superposition-like combination of the photosensor pixels in the first G, second G, R, and B image sensors has a configuration shown in FIG. 9.

A third prior-art imaging apparatus disclosed in Japanese patent application publication number 11-234690/1999 includes an image sensor provided with a color filter having a pixel array shown in FIG. 10. The third prior-art imaging apparatus detects the difference in signal level between left and right pixels and the difference in signal level between upper and lower pixels, and thus detects signal edge components. Interpolation responsive to the detected differences is implemented in order to generate a video signal segment corresponding to each omitted pixel. Specifically, the third prior-art imaging apparatus calculates the absolute value $\Delta H$ of the difference in signal level between left and right pixels and the absolute value $\Delta V$ of the difference in signal level between upper and lower pixels for each omitted pixel of interest.

With reference to FIG. 10, the horizontal-direction difference $\Delta H$ and the vertical-direction difference $\Delta V$ for a pixel position (2i, 2j+1) are given as follows.

$$\Delta H = |G(2i,2j) - G(2i,2j+2)| \quad (1)$$

$$\Delta V = |G(2i-1,2j+1) - G(2i+1,2j+1)| \quad (2)$$

Signal level changes at surrounding pixels along the horizontal direction and the vertical direction are decided on the basis of the horizontal-direction edge component (the horizontal-direction difference) $\Delta H$ and the vertical-direction edge component (the vertical-direction difference) $\Delta V$. In the case where the value $\Delta H$ or the value $\Delta V$ is greater than a predetermined value "th", it is decided that an edge component exists for that pixel. In this case, when the value $\Delta H$ is greater than the value $\Delta V$, it is further decided that a high correlation occurs in the vertical direction. On the other hand, when the value $\Delta H$ is equal to or smaller than the value $\Delta V$, it is further decided that a high correlation occurs in the horizontal direction. An optimal interpolation method is selected in accordance with the results of these decisions. In the case where the values $\Delta H$ and $\Delta V$ are equal to or smaller than the predetermined value "th", it is decided that an edge component is absent for that pixel. In this case, the average of signal levels at the upper, lower, left, and right pixels is calculated, and interpolation-result pixel data is generated from the calculated average.

A fourth prior-art imaging apparatus disclosed in Japanese patent application publication number 10-155158/1998 uses a method of calculating a direction-dependent correlation. In the fourth prior-art imaging apparatus, with respect to a pixel sequence Yn in a certain direction, the degree S of a correlation is given as follows.

$$S = \min(Yn)/\max(Yn)$$

where "min" denotes an operator for selecting minimum one, and "max" denotes an operator for selecting maximum one. In the above equation, $S \leq 1$ and the maximum value of the correlation degree S is equal to 1. The correlation degree S is calculated according to the above equation. The direction in which the calculated correlation peaks is decided as a correlation direction. Then, optimal interpolation is implemented in accordance with the decided correlation direction.

The first, second, third, and fourth prior-art imaging apparatuses have drawbacks as follows.

In the first prior-art imaging apparatus, omitted pixels related to oblique directions are many. Accordingly, the higher-definition effect provided by the slight differences in optical position between the G, R, and B image sensors is reduced for oblique-direction definitions. For example, as shown in FIG. 11, pixels are absent from positions on the dashed oblique lines, and pixel data information about those pixels is unavailable. Therefore, it is difficult to attain a sufficient high definition for oblique lines.

The second prior-art imaging apparatus uses the four image sensors (the R, G1, G2, and B image sensors). Accordingly, the number of designing steps is large. The cost of the apparatus is high. The number of production steps is large. An optical block is large in size.

Figure 12:
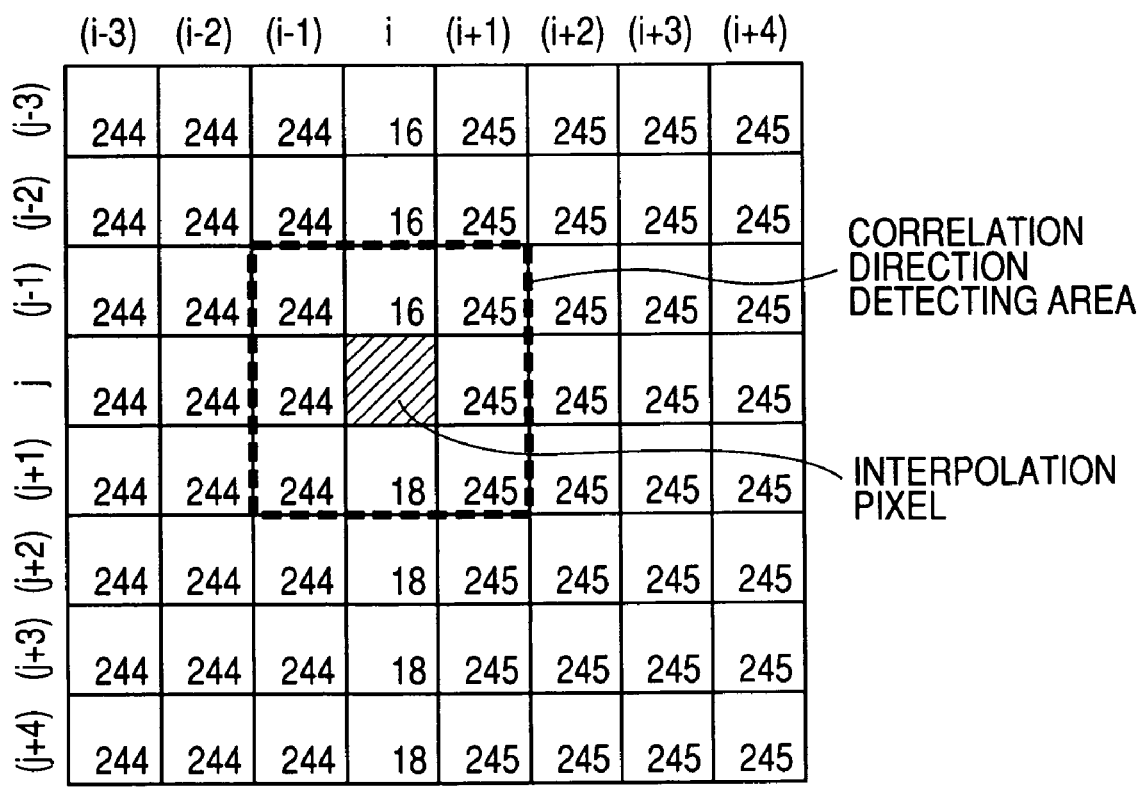
FIG. 12 is a diagram showing an array of the values of pixel-corresponding data pieces in the third prior-art imaging apparatus.

In the third prior-art imaging apparatus, the differences between pixel-corresponding data pieces are used as indications of the degrees of correlations, and an interpolation direction is decided in accordance with the degrees of correlations. Correlations in horizontal and vertical directions are considered while those in oblique directions are not. Accordingly, for high-frequency signal components, the calculation of the degrees of correlations tends to be inaccurate, and the decided interpolation direction tends to be unreliable. Under the conditions in FIG. 12, with respect to interpolation for generating the data value about a pixel (i, j), it is desirable that a high correlation in a vertical direction is decided to be present, and the data value about the pixel (i, j) is equal to 17 (the average of the values about upper and lower pixels, (16+18)/2=17). In the third prior-art imaging apparatus, the calculated horizontal-direction difference ΔH is given as "ΔH=|245−244|=1" while the calculated vertical-direction difference ΔV is given as "ΔV=|18−16|=2". Since ΔH<ΔV, it is erroneously decided that a horizontal-direction correlation is higher than a vertical-direction correlation. If the values ΔH and ΔV are equal to or smaller than the predetermined value "th", the data value about the pixel (i, j) is calculated from the average of those about the surrounding pixels through the interpolation. Therefore, the calculated data value about the pixel (i, j) is greater than the desired value. The number of samples (pixels) used for the decision about the direction of a correlation is relatively small as mentioned above, and hence the decided correlation direction tends to be low in reliability.

The fourth prior-art imaging apparatus uses the interpolation method in which the degree of each correlation is calculated from the ratio "MIN/MAX" between the minimum value and the maximum value among the data values about sample pixels. Only the minimum value and the maximum value are considered for the calculation of each correlation degree while other values (non-minimum and non-maximum values) are not. Accordingly, for high-frequency signal components, the calculation of the degrees of correlations tends to be inaccurate, and the decided interpolation direction tends to be unreliable.

This invention has been carried out in order to remove the above-mentioned drawbacks in the first, second, third, and fourth prior-art imaging apparatuses.

First Embodiment

Figure 13:
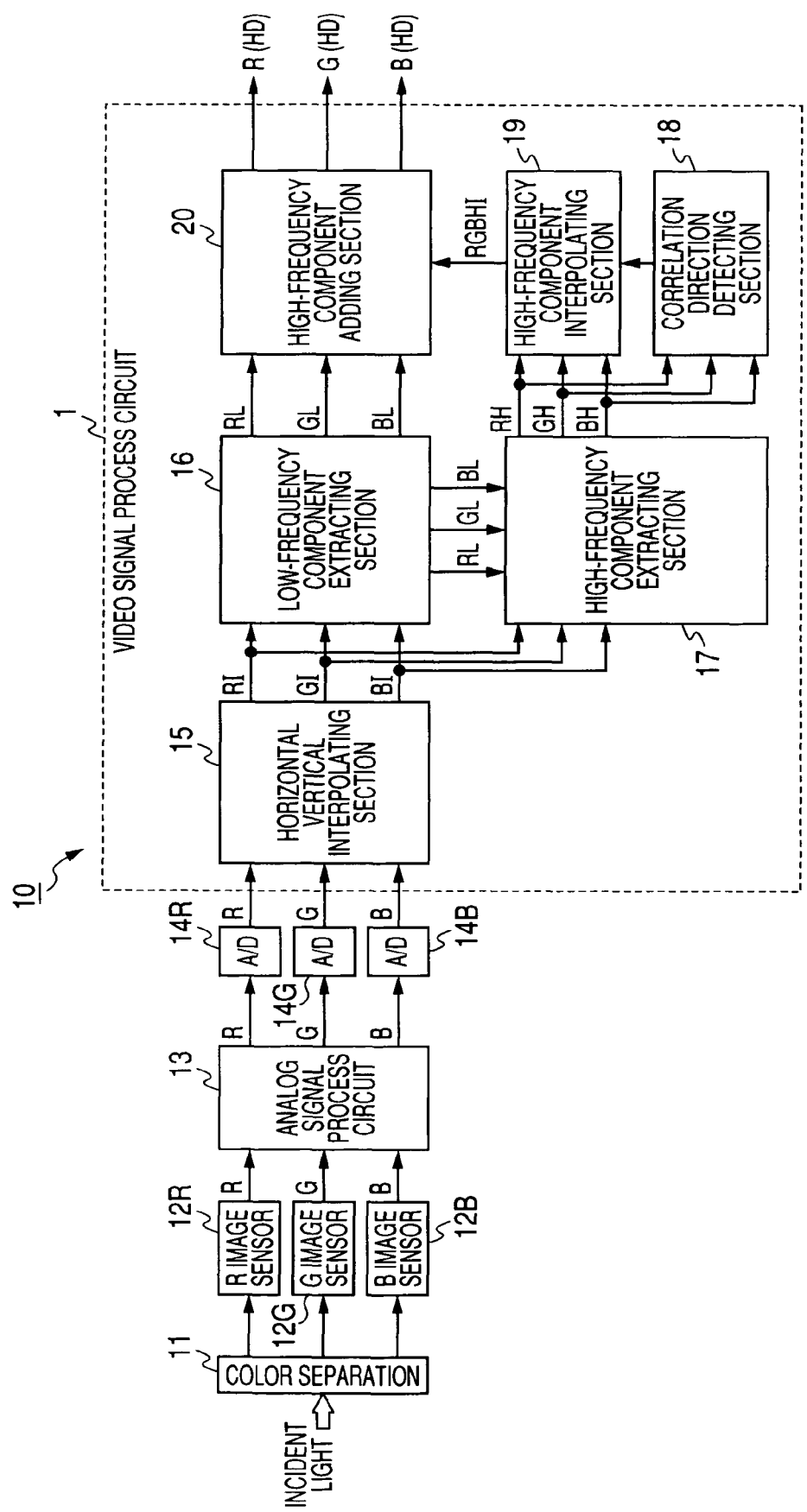
FIG. 13 is a block diagram of an imaging apparatus according to a first embodiment of this invention.

FIG. 13 shows an imaging apparatus according to a first embodiment of this invention. The imaging apparatus of FIG. 13 includes a color-separation optical system 11, and solid-state image sensors 12R, 12G, and 12B for red, green, and blue (R, G, and B) respectively.

The optical system 11 separates incident light into a red (R) light beam, a green (G) light beam, and a blue (B) light beam, which are applied to the image sensors 12R, 12G, and 12B respectively. The image sensor 12R changes the R light beam into a corresponding electric analog R signal through photoelectric conversion. The image sensor 12G changes the G light beam into a corresponding electric analog G signal through photoelectric conversion. The image sensor 12B changes the B light beam into a corresponding electric analog B signal through photoelectric conversion. The image sensors 12R, 12G, and 12B output the analog R, G, and B signals, respectively.

The imaging apparatus of FIG. 13 further includes an analog signal processing circuit 13, A/D converters 14R, 14G, and 14B, and a video signal processing circuit 1.

The analog signal processing circuit 13 receives the analog R, G, and B signals from the image sensors 12R, 12G, and 12B. The analog signal processing circuit 13 subjects the received analog R signal to known analog signal processing to generate a processed analog R signal. The analog signal processing circuit 13 subjects the received analog G signal to known analog signal processing to generate a processed analog G signal. The analog signal processing circuit 13 subjects the received analog B signal to known analog signal processing to generate a processed analog B signal. The analog signal processing circuit 13 outputs the processed analog R, G, and B signals.

The A/D converters 14R, 14G, and 14B receive the processed analog R, G, and B signals from the analog signal processing circuit 13, respectively. The A/D converter 14R changes the received analog R signal into a corresponding digital R signal. The A/D converter 14G changes the received analog G signal into a corresponding digital G signal. The A/D converter 14B changes the received analog B signal into a corresponding digital B signal. The A/D converters 14R, 14G, and 14B output the digital R, G, and B signals, respectively. For every frame, each of the digital R, G, and B signals is divided into pixel-corresponding segments, namely segments representing respective pixels.

The video signal processing circuit 1 receives the digital R, G, and B signals from the A/D converters 14R, 14G, and 14B. The video signal processing circuit 1 includes a horizontal-vertical interpolating section 15, a low-frequency component extracting section 16, a high-frequency component extracting section 17, a correlation-direction detecting section 18, a high-frequency component interpolating section 19, and a high-frequency component adding section 20.

The horizontal-vertical interpolating section 15 receives the digital R, G, and B signals from the A/D converters 14R, 14G, and 14B. The horizontal-vertical interpolating section 15 implements two-dimensional interpolation to convert the received digital R signal into an interpolation-result red signal RI representing not only original pixels corresponding to the received digital R signal but also added pixels horizontally and vertically located between the original pixels for every frame. In addition, the horizontal-vertical interpolating section 15 implements two-dimensional interpolation to convert the received digital G signal into an interpolation-result green signal GI representing not only original pixels corresponding to the received digital G signal but also added pixels horizontally and vertically located between the original pixels for every frame. Furthermore, the horizontal-vertical interpolating section 15 implements two-dimensional interpolation to convert the received digital B signal into an interpolation-result blue signal BI representing not only original pixels corresponding to the received digital B signal but also added pixels horizontally and vertically located between the original pixels for every frame.

The low-frequency component extracting section 16 processes the interpolation-result red, green, and blue signals RI, GI, and BI generated by the horizontal-vertical interpolating section 15. Specifically, the low-frequency component extracting section 16 extracts low-frequency components, which are defined in every two-dimensional space (every frame), from the interpolation-result red signal RI to generate a low-frequency red signal RL. In addition, the low-frequency component extracting section 16 extracts low-frequency components, which are defined in every two-dimensional space (every frame), from the interpolation-result green signal GI to generate a low-frequency green signal GL. Furthermore, the low-frequency component extracting section 16 extracts low-frequency components, which are defined in every two-dimensional space (every frame), from the interpolation-result blue signal BI to generate a low-frequency blue signal BL. Preferably, the low-frequency components extracted by the low-frequency component extracting section 16 mean signal components having spatial frequencies lower than a first predetermined reference spatial frequency.

The high-frequency component extracting section 17 processes the interpolation-result red, green, and blue signals RI, GI, and BI generated by the horizontal-vertical interpolating section 15. Specifically, the high-frequency component extracting section 17 extracts high-frequency components, which are defined in every two-dimensional space (every frame), from the interpolation-result red signal RI to generate a high-frequency red signal RH. In addition, the high-frequency component extracting section 17 extracts high-frequency components, which are defined in every two-dimensional space (every frame), from the interpolation-result green signal GI to generate a high-frequency green signal GH. Furthermore, the high-frequency component extracting section 17 extracts high-frequency components, which are defined in every two-dimensional space (every frame), from the interpolation-result blue signal BI to generate a high-frequency blue signal BH. Preferably, the high-frequency components extracted by the high-frequency component extracting section 17 mean signal components having spatial frequencies higher than a second predetermined reference spatial frequency. Preferably, the second predetermined reference spatial frequency is equal to or higher than the first predetermined reference spatial frequency.

The correlation-direction detecting section 18 responds to the high-frequency red, green, and blue signals RH, GH, and BH generated by the high-frequency component extracting section 17. The correlation-direction detecting section 18 maps or places pixel-corresponding segments of the high-frequency red, green, and blue signals RH, GH, and BH onto correct pixel positions in every two-dimensional space (every frame). The correlation-direction detecting section 18 detects different-direction correlations among pixels in every two-dimensional space (every frame) represented by the mapped high-frequency red, green, and blue signals RH, GH, and BH. Specifically, the correlation-direction detecting section 18 calculates the standard deviations of pixel signal values in every two-dimensional space along different predetermined directions, and detects different-direction correlations through the use of the calculated standard deviations. The correlation-direction detecting section 18 decides which of the detected different-direction correlations is the highest. The correlation-direction detecting section 18 identifies, among the different predetermined directions, one direction related to the highest correlation. The correlation-direction detecting section 18 notifies the identified highest-correlation direction to the high-frequency component interpolating section 19.

The high-frequency component interpolating section 19 receives the high-frequency red, green, and blue signals RH, GH, and BH from the high-frequency component extracting section 17. The high-frequency component interpolating section 19 maps or places pixel-corresponding segments of the high-frequency red, green, and blue signals RH, GH, and BH onto correct pixel positions in every two-dimensional space (every frame). The high-frequency component interpolating section 19 implements interpolation responsive to the mapped high-frequency red, green, and blue signals RH, GH, and BH and also responsive to the highest-correlation direction identified by the correlation-direction detecting section 18. Thereby, the high-frequency component interpolating section 19 generates a high-frequency composite signal or a high-frequency interpolation-result signal RGBHI. Specifically, the high-frequency component interpolating section 19 converts the received high-frequency red, green, and blue signals RH, GH, and BH into the high-frequency interpolation-result signal (the high-frequency composite signal) RGBHI through an interpolation-based process responsive to the highest-correlation direction identified by the correlation-direction detecting section 18.

The high-frequency component adding section 20 receives the low-frequency red, green, and blue signals RL, GL, and BL from the low-frequency component extracting section 16. The high-frequency component adding section 20 receives the high-frequency interpolation-result signal RGBHI from the high-frequency component interpolating section 19. The high-frequency component adding section 20 combines the low-frequency red signal RL and the high-frequency interpolation-result signal RGBHI into a high-definition red signal R(HD). In addition, the high-frequency component adding section 20 combines the low-frequency green signal GL and the high-frequency interpolation-result signal RGBHI into a high-definition green signal G(HD). Furthermore, the high-frequency component adding section 20 combines the low-frequency blue signal BL and the high-frequency interpolation-result signal RGBHI into a high-definition blue signal B(HD). In this way, the high-frequency component adding section 20 adds the high-frequency interpolation-result signal RGBHI to the low-frequency red signal RL, the low-frequency green signal GL, and the low-frequency blue signal BL to generate a set of the high-definition component video signals R(HD), G(HD), and B(HD). The high-frequency component adding section 20 outputs the set of the high-definition component video signals R(HD), G(HD), and B(HD).

Figure 14:
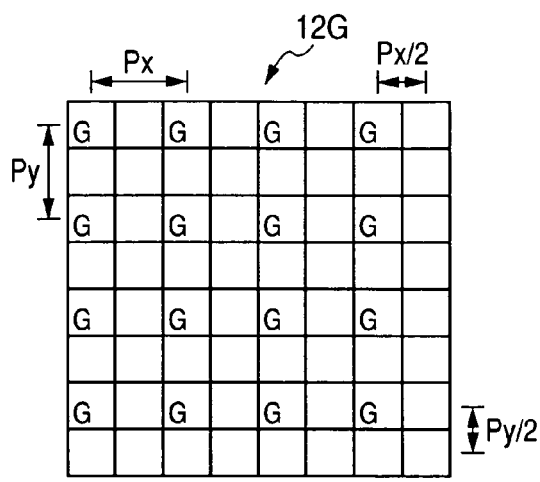
FIG. 14 is a diagram of an array of photosensor pixels in a green image sensor in FIG. 13.

The image sensor 12G has an array of photosensor pixels shown in FIG. 14 where "G" denotes the position of each photosensor pixel. The image sensor 12R has an array of photosensor pixels shown in FIG. 15 where "R" denotes the position of each photosensor pixel. The image sensor 12B has an array of photosensor pixels shown in FIG. 16 where "B" denotes the position of each photosensor pixel. In each of the image sensors 12G, 12R, and 12B, photosensor pixels are spaced at a pitch Px along a horizontal direction and at a pitch Py along a vertical direction.

Figure 15:
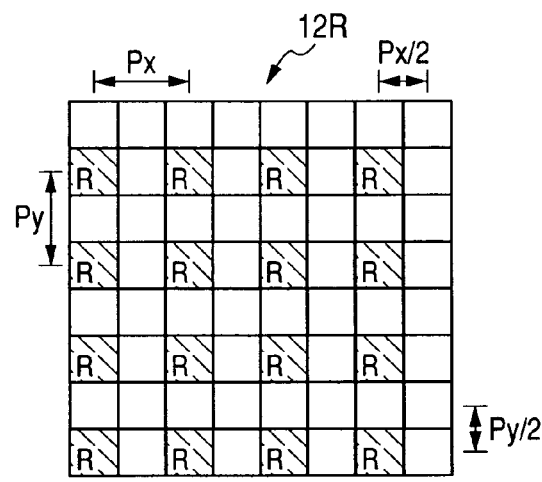
FIG. 15 is a diagram of an array of photosensor pixels in a red image sensor in FIG. 13.
Figure 16:
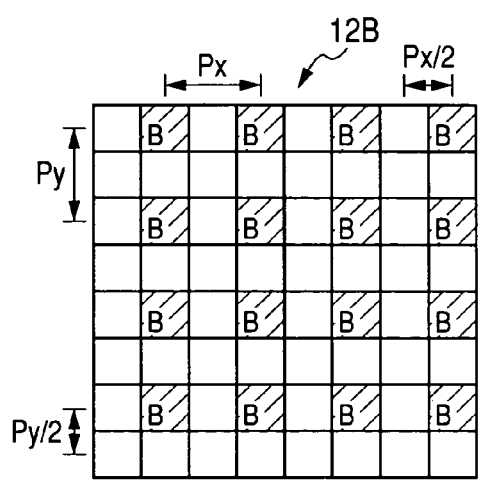
FIG. 16 is a diagram of an array of photosensor pixels in a blue image sensor in FIG. 13.
Figure 17:
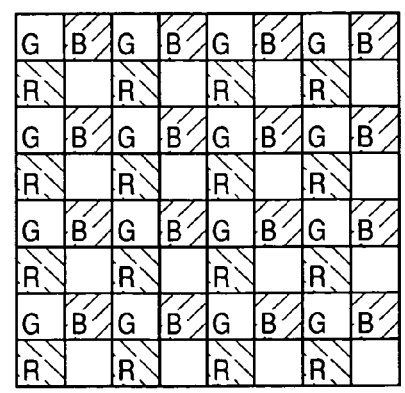
FIG. 17 is a diagram of a superposition-like combination of the photosensor pixels in the image sensors in FIGS. 14, 15, and 16.

As shown in FIGS. 14 and 15, the optical position of the image sensor 12R relative to the incident light slightly differs from that of the image sensor 12G such that the photosensor pixels in the image sensors 12R and 12G are staggered at vertical intervals equal to half the vertical pixel pitch Py. As shown in FIGS. 14 and 16, the optical position of the image sensor 12B relative to the incident light slightly differs from that of the image sensor 12G such that the photosensor pixels in the image sensors 12B and 12G are staggered at horizontal intervals equal to half the horizontal pixel pitch Px. Accordingly, a superposition-like combination of the photosensor pixels in the image sensors 12R, 12G, and 12B has a configuration shown in FIG. 17. In this combination, all the photosensor pixels do not overlap, and there is only a small number of omitted pixels or nonexistent pixels (blank squares in FIG. 17). Thus, it is possible to attain a high definition of video.

With reference back to FIG. 13, incident light from a subject travels to the optical system 11 through an optical low pass filter (not shown). The optical system 11 separates the incident light into a red (R) light beam, a green (G) light beam, and a blue (B) light beam, which are applied to the image sensors 12R, 12G, and 12B respectively. The image sensor 12R changes the R light beam into a corresponding electric analog R signal through photoelectric conversion. The image sensor 12G changes the G light beam into a corresponding electric analog G signal through photoelectric conversion. The image sensor 12B changes the B light beam into a corresponding electric analog B signal through photoelectric conversion. The image sensors 12R, 12G, and 12B output the analog R, G, and B signals, respectively.

Preferably, each of the image sensors 12R, 12G, and 12B includes CCDs (Charge Coupled Devices), and is driven by a clock signal fed from a timing signal generator (not shown). The R light beam forms an R image of the subject on the photoelectric conversion surface of the image sensor 12R. The G light beam forms a G image of the subject on the photoelectric conversion surface of the image sensor 12G. The B light beam forms a B image of the subject on the photoelectric conversion surface of the image sensor 12B. The image sensor 12R spatially samples the R image in response to the clock signal at a prescribed sampling frequency "fs", thereby generating the analog R signal. The image sensor 12G spatially samples the G image in response to the clock signal at the prescribed sampling frequency "fs", thereby generating the analog G signal. The image sensor 12B spatially samples the B image in response to the clock signal at the prescribed sampling frequency "fs", thereby generating the analog B signal.

The analog signal processing circuit 13 receives the analog R, G, and B signals from the image sensors 12R, 12G, and 12B. The analog signal processing circuit 13 subjects the received analog R signal to prescribed analog signal processing such as CDS-based (correlated-double-sampling-based) noise reduction, AGC-based level adjustment, and white balance to generate a processed analog R signal. Similarly, the analog signal processing circuit 13 subjects the received analog G signal to the prescribed analog signal processing to generate a processed analog G signal. Furthermore, the analog signal processing circuit 13 subjects the received analog B signal to the prescribed analog signal processing to generate a processed analog B signal. The analog signal processing circuit 13 outputs the processed analog R, G, and B signals.

The A/D converters 14R, 14G, and 14B receive the processed analog R, G, and B signals from the analog signal processing circuit 13, respectively. The A/D converter 14R digitizes the received analog R signal in response to a clock signal with the prescribed sampling frequency "fs" to generate a digital R signal. The A/D converter 14G digitizes the received analog G signal in response to a clock signal with the prescribed sampling frequency "fs" to generate a digital G signal. The A/D converter 14B digitizes the received analog B signal in response to a clock signal with the prescribed sampling frequency "fs" to generate a digital B signal. The A/D converters 14R, 14G, and 14B output the digital R, G, and B signals, respectively.

The horizontal-vertical interpolating section 15 in the video signal processing circuit 1 receives the digital R, G, and B signals from the A/D converters 14R, 14G, and 14B. The horizontal-vertical interpolating section 15 implements two-dimensional interpolation, namely horizontal and vertical interpolation, through the use of the received digital R, G, and B signals. Specifically, for every frame, the horizontal-vertical interpolating section 15 interposes dummy pixel-corresponding signal segments (for example, "0") among the pixel-corresponding segments of the received digital G signal to generate a sample-number-increased green signal (a pixel-number-increased green signal) representing an array of pixels shown in FIG. 18. Thus, the horizontal-vertical interpolating section 15 inserts a dummy pixel-corresponding signal segment between every two adjacent pixel-corresponding segments of the received digital G signal. For every frame, the horizontal-vertical interpolating section 15 interposes dummy pixel-corresponding signal segments (for example, "0") among the pixel-corresponding segments of the received digital R signal to generate a sample-number-increased red signal (a pixel-number-increased red signal) representing an array of pixels shown in FIG. 19. Thus, the horizontal-vertical interpolating section 15 inserts a dummy pixel-corresponding signal segment between every two adjacent pixel-corresponding segments of the received digital R signal. For every frame, the horizontal-vertical interpolating section 15 interposes dummy pixel-corresponding signal segments (for example, "0") among the pixel-corresponding segments of the received digital B signal to generate a sample-number-increased blue signal (a pixel-number-increased blue signal) representing an array of pixels shown in FIG. 20. Thus, the horizontal-vertical interpolating section 15 inserts a dummy pixel-corresponding signal segment between every two adjacent pixel-corresponding segments of the received digital B signal.

Preferably, each of the dummy pixel-corresponding signal segments is prescribed one such as a signal segment of "0". The dummy pixel-corresponding signal segments may be replaced by predetermined ineffective pixel-corresponding signal segments.

Figure 21:
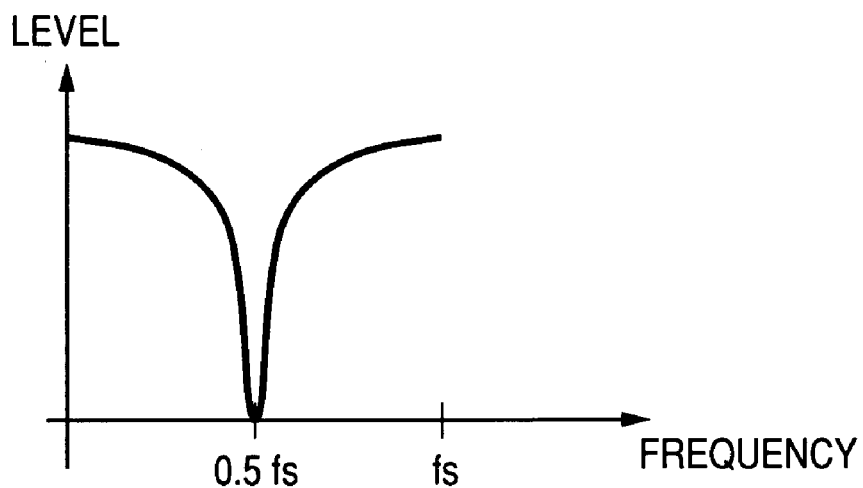
FIG. 21 is a diagram showing an example of the frequency spectrum of a digital R, G, or B signal received by the horizontal-vertical interpolating section in FIG. 13.
Figure 22:
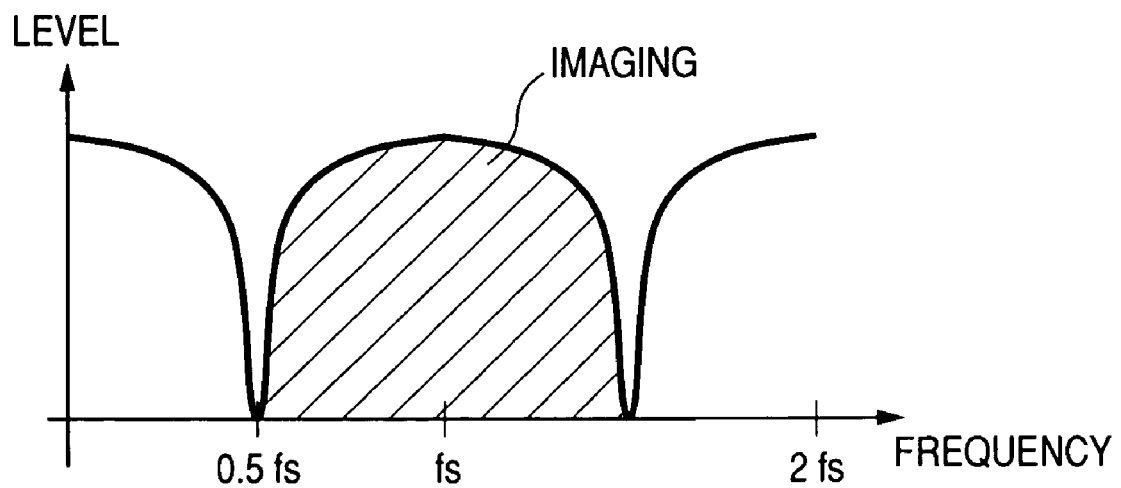
FIG. 22 is a diagram showing an example of the frequency spectrum of the sample-number-increased red, green, or blue signal generated by the horizontal-vertical interpolating section in FIG. 13.

When the digital R signal received by the horizontal-vertical interpolating section 15 has a frequency spectrum such as shown in FIG. 21, the frequency spectrum of the sample-number-increased red signal generated by the horizontal-vertical interpolating section 15 assumes conditions shown in FIG. 22. The digital G and B signals received by the horizontal-vertical interpolating section 15 and the sample-number-increased green and blue signals generated by the horizontal-vertical interpolating section 15 are in frequency-spectrum relations similar to the above one. Interposing the dummy pixel-corresponding signal segments among the pixel-corresponding segments of the received digital R signal increases the sampling frequency from "fs" to "2 fs", and causes aliasing and imaging (see FIG. 22) in the sample-number-increased red signal. Similarly, there occur aliasing and imaging in the sample-number-increased green and blue signals. The horizontal-vertical interpolating section 15 includes low pass filters having a cutoff frequency equal to a value of "0.5 fs". The sample-number-increased red, green, and blue signals are passed through the low pass filters to generate interpolation-result red, green, and blue signals RI, GI, and BI, respectively. Preferably, each of the low pass filters is of a two-dimensional type having a horizontal low pass filter and a vertical low pass filter. The low pass filters include, for example, FIR filters.

The low pass filtering causes interpolation which changes the value of each dummy signal segment from "0" to an interpolation-result value depending on the values of actual signal segments representing pixels neighboring the pixel represented by the dummy signal segment in vertical and horizontal directions.

Figure 23:
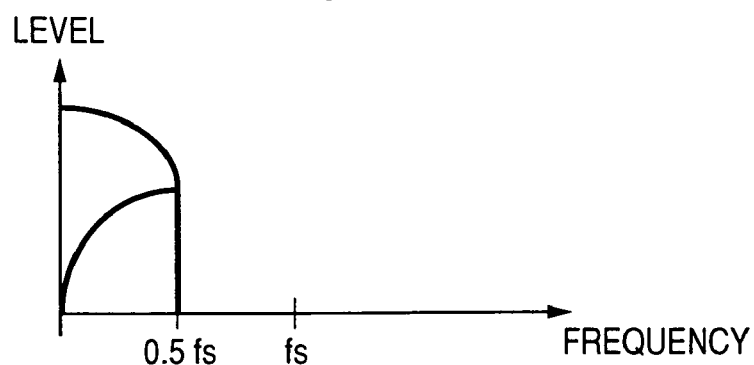
FIG. 23 is a diagram showing an example of the frequency spectrum of an interpolation-result red, green, or blue signal generated by the horizontal-vertical interpolating section in FIG. 13.

Each of the interpolation-result red, green, and blue signals RI, GI, and BI has a frequency spectrum such as shown in FIG. 23. Thus, each of the interpolation-result red, green, and blue signals RI, GI, and BI consists of only components having frequencies up to a value of "0.5 fs". Components of the received digital R, G, and B signals which have frequencies up to a value of "0.5 fs" remain in the interpolation-result red, green, and blue signals RI, GI, and BI as they are.

Figure 24:
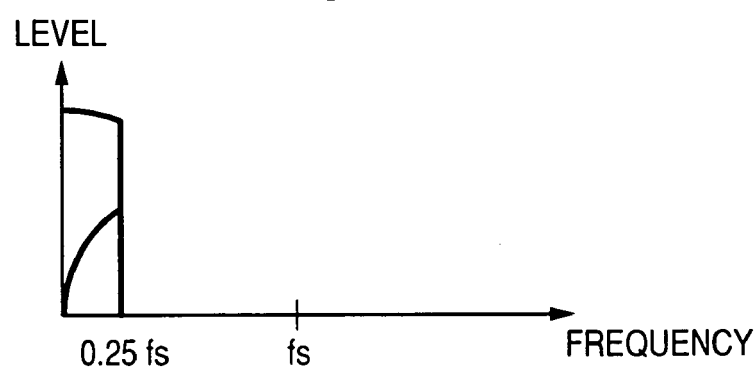
FIG. 24 is a diagram showing an example of the frequency spectrum of a low-frequency red, green, or blue signal generated by a low-frequency component extracting section in FIG. 13.

The low-frequency component extracting section 16 includes two-dimensional low pass filters each having a horizontal low pass filter and a vertical low pass filter with a cutoff frequency equal to a value of "0.25 fs". The two-dimensional low pass filters include, for example, FIR filters. The interpolation-result red, green, and blue signals RI, GI, and BI are passed through the two-dimensional low pass filters in the low-frequency component extracting section 16 to generate low-frequency red, green, and blue signals RL, GL, and BL, respectively. Each of the low-frequency red, green, and blue signals RL, GL, and BL has a frequency spectrum such as shown in FIG. 24.

Figure 25:
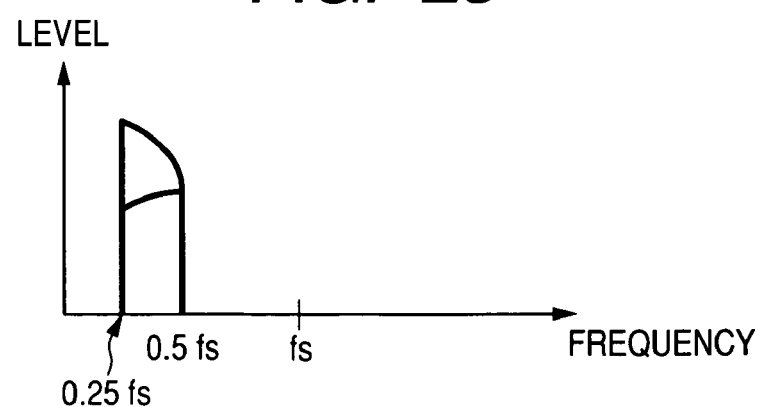
FIG. 25 is a diagram showing an example of the frequency spectrum of a high-frequency red, green, or blue signal generated by a high-frequency component extracting section in FIG. 13.

The high-frequency component extracting section 17 subtracts the low-frequency red signal RL from the interpolation-result red signal RI to generate a high-frequency red signal RH. In addition, the high-frequency component extracting section 17 subtracts the low-frequency green signal GL from the interpolation-result green signal GI to generate a high-frequency green signal GH. Furthermore, the high-frequency component extracting section 17 subtracts the low-frequency blue signal BL from the interpolation-result blue signal BI to generate a high-frequency blue signal BH. Each of the high-frequency red, green, and blue signals RH, GH, and BH has a frequency spectrum such as shown in FIG. 25. In order to generate the high-frequency red, green, and blue signals RH, GH, and BH, the high-frequency component extracting section 17 uses the following equations.

$$RH=RI-RL,\ GH=GI-GL,\ BH=BI-BL \quad (3)$$

The high-frequency red, green, and blue signals RH, GH, and BH are fed from the high-frequency component extracting section 17 to the correlation-direction detecting section 18 and the high-frequency component interpolating section 19.

Each of the correlation-direction detecting section 18 and the high-frequency component interpolating section 19 maps or places pixel-corresponding segments of the high-frequency red, green, and blue signals RH, GH, and BH onto correct pixel positions in every frame to generate a pixel arrangement shown in FIG. 26. As previously mentioned, a superposition-like combination of the photosensor pixels in the image sensors 12R, 12G, and 12B has a configuration shown in FIG. 17 where actual pixel positions are denoted by "R", "G", and "B" and nonexistent pixel positions are denoted by the blank squares. Thus, it is possible to place pixel-corresponding segments of the high-frequency red, green, and blue signals RH, GH, and BH onto the actual pixel positions and the nonexistent pixel positions. The pixel arrangement in FIG. 26 has nonexistent pixel positions denoted by "NON" which originate from the nonexistent pixel positions (the blank squares) in FIG. 17. Accordingly, the nonexistent pixel positions "NON" correspond to none of the photosensor pixels in the image sensors 12R, 12G, and 12B. The nonexistent pixel positions "NON" are assigned high-frequency signal components changed from dummy signal segments through the interpolation by the horizontal-vertical interpolating section 15. The high-frequency component interpolating section 19 generates pixel-corresponding signal segments for the respective nonexistent pixel positions "NON" through an interpolation-based process responsive to the pixel-corresponding segments of the mapped high-frequency red, green, and blue signals RH, GH, and BH. This interpolation-based process is further responsive to the highest-correlation direction identified by the correlation-direction detecting section 18. The pixels at the positions "NON" are referred to as the interpolation pixels.

The correlation-direction detecting section 18 detects different-direction correlations on the basis of the mapped high-frequency red, green, and blue signals RH, GH, and BH for an interpolation-based process to generate a pixel-corresponding signal segment assigned to every nonexistent pixel position "NON". Then, the correlation-direction detecting section 18 decides a direction in which the highest of the detected different-direction correlations occurs. The correlation-direction detecting section 18 notifies the decided direction to the high-frequency component interpolating section 19. In response to the decided direction, the high-frequency component interpolating section 19 implements an interpolation-based process to generate a pixel-corresponding signal segment for the nonexistent pixel position of interest. As previously mentioned, subtracting the low-frequency red, green, and blue signals RL, GL, and BL from the interpolation-result red, green, and blue signals RI, GI, and BI cause the high-frequency red, green, and blue signals RH, GH, and BH. Therefore, the high-frequency red, green, and blue signals RH, GH, and BH are free from aliasing components and color components which would adversely affect the detection of different-direction correlations. Thus, the detection of different-direction correlations and the decision about a correlation-peak direction through the use of the high-frequency red, green, and blue signals RH, GH, and BH are better in accuracy than those using signals containing low-frequency components.

In more detail, the correlation-direction detecting section 18 calculates four standard deviations among the values of pixels represented by the high-frequency red, green, and blue signals RH, GH, and BH in a window centered at every nonexistent pixel position "NON". The four standard deviations are along a vertical direction, a horizontal direction, a 45-degree oblique direction, and a 135-degree oblique direction, respectively. These four directions pass the nonexistent pixel position "NON" of interest. The correlation-direction detecting section 18 identifies the smallest one among the four standard deviations. The correlation-direction detecting section 18 decides that a smallest pixel-value variation occurs and hence a highest correlation occurs in the direction related to the smallest standard deviation.

In general, a standard deviation "σ" is expressed by the following equation.

$$\sigma = \sqrt{\frac{1}{N}\sum_{i=1}^{N}(x_i - x_{ave})^2} \quad (4)$$

where "N" denotes the number of samples and "$x_i$" denotes the value of each of the samples, and "$x_{ave}$" denotes the mean of the values of the samples. A simplified equation for the above equation (4) is as follows.

$$\sigma = \frac{1}{N}\sum_{i=1}^{N}|x_i - x_{ave}| \quad (5)$$

The correlation-direction detecting section 18 uses the simplified equation (5) in calculating each of the four standard deviations. The use of the simplified equation (5) allows a reduction in the circuit scale. Pixel-corresponding segments of the high-frequency red, green, and blue signals RH, GH, and BH are taken as samples. Preferably, five pixel-corresponding segments of the high-frequency red, green, and blue signals RH, GH, and BH are selected as samples for calculating each of the four standard deviations.

For a better understanding, a description is given of the following example. With reference to FIG. 26, when the nonexistent pixel position (i, j) is of interest, pixel-corresponding segments BH(i, j−2), BH(i, j−1), BH(i, j), BH(i, j+1), and BH(i, j+2) of the high-frequency blue signal BH are selected as samples to calculate the standard deviation along the vertical direction. Pixel-corresponding segments RH(i−2, j), RH(i−1, j), RH(i, j), RH(i+1, j), and RH(i+2, j) of the high-frequency red signal RH are selected as samples to calculate the standard deviation along the horizontal direction. Pixel-corresponding segments GH(i−2, j+2), GH(i−1, j+1), GH(i, j), GH(i+1, j−1), and GH(i+2, j−2) of the high-frequency green signal GH are selected as samples to calculate the standard deviation along the 45-degree oblique direction. Pixel-corresponding segments GH(i−2, j−2), GH(i−1, j−1), GH(i, j), GH(i+1, j+1), and GH(i+2, j+2) of the high-frequency green signal GH are selected as samples to calculate the standard deviation along the 135-degree oblique direction. The samples for calculating the standard deviation along each of the vertical, horizontal, 45-degree oblique, and 135-degree oblique directions contain ones at nonexistent pixel positions inclusive of the nonexistent pixel position of interest. It should be noted that there are high-frequency signal components at these nonexistent pixel positions which are changed from the dummy signal segments through the interpolation by the horizontal-vertical interpolating section 15.

The four calculated standard deviations "σ" are used as an indication of the four detected different-direction correlations. In general, a correlation increases as a corresponding standard deviation decreases. The use of the standard deviations allows accurate detection of the different-direction correlations. The correlation-direction detecting section 18 decides which of the four calculated standard deviations is the smallest, that is, which of the four detected correlations is the highest. Then, the correlation-direction detecting section 18 identifies, among the four different directions, one direction related to the smallest standard deviation (or the highest correlation). The correlation-direction detecting section 18 labels the identified direction as the highest-correlation direction. The correlation-direction detecting section 18 notifies the highest-correlation direction to the high-frequency component interpolating section 19.

With respect to the nonexistent pixel position (i, j) of interest, the calculated standard deviations in the vertical, horizontal, 45-degree oblique, and 135-degree oblique directions are denoted by "a", "b", "c", and "d", respectively. The correlation-direction detecting section 18 compares the standard deviations "a", "b", "c", and "d" to decide the smallest one thereamong. When the standard deviation "a" is the smallest, the correlation-direction detecting section 18 concludes that the correlation along the vertical direction is the highest among the correlations along the four directions. Then, the correlation-direction detecting section 18 labels the vertical direction as the highest-correlation direction. When the standard deviation "b" is the smallest, the correlation-direction detecting section 18 concludes that the correlation along the horizontal direction is the highest among the correlations along the four directions. Then, the correlation-direction detecting section 18 labels the horizontal direction as the highest-correlation direction. When the standard deviation "c" is the smallest, the correlation-direction detecting section 18 concludes that the correlation along the 45-degree oblique direction is the highest among the correlations along the four directions. Then, the correlation-direction detecting section 18 labels the 45-degree oblique direction as the highest-correlation direction. When the standard deviation "d" is the smallest, the correlation-direction detecting section 18 concludes that the correlation along the 135-degree oblique direction is the highest among the correlations along the four directions. Then, the correlation-direction detecting section 18 labels the 135-degree oblique direction as the highest-correlation direction. As previously mentioned, the correlation-direction detecting section 18 notifies the highest-correlation direction to the high-frequency component interpolating section 19.

Figure 27:
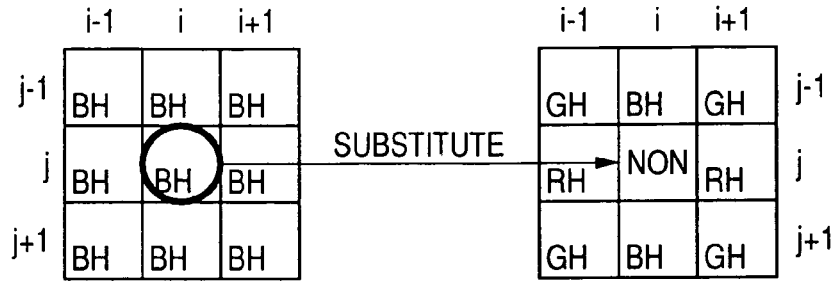
FIG. 27 is a diagram of the relation between a nonexistent pixel and a pixel-corresponding segment of the high-frequency blue signal which is adopted for the nonexistent pixel when a highest-correlation direction is a vertical direction.
Figure 28:
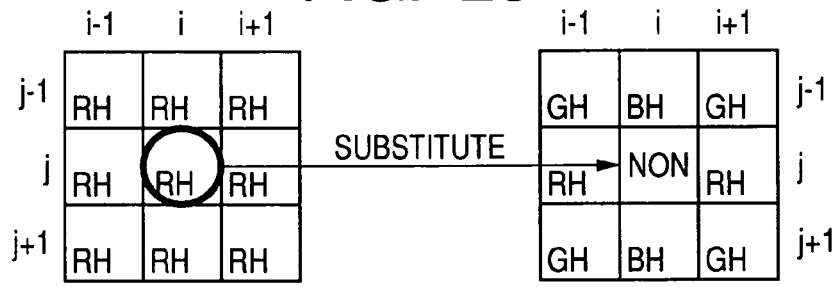
FIG. 28 is a diagram of the relation between a nonexistent pixel and a pixel-corresponding segment of the high-frequency red signal which is adopted for the nonexistent pixel when a highest-correlation direction is a horizontal direction.
Figure 29:
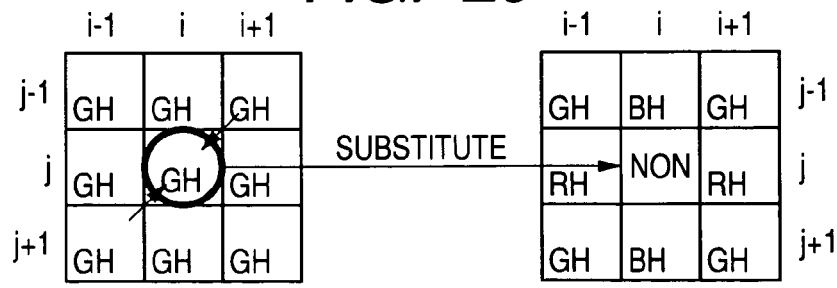
FIG. 29 is a diagram of the relation between a nonexistent pixel and pixel-corresponding segments of the high-frequency green signal which are adopted for the nonexistent pixel when a highest-correlation direction is a 45-degree oblique direction.
Figure 30:
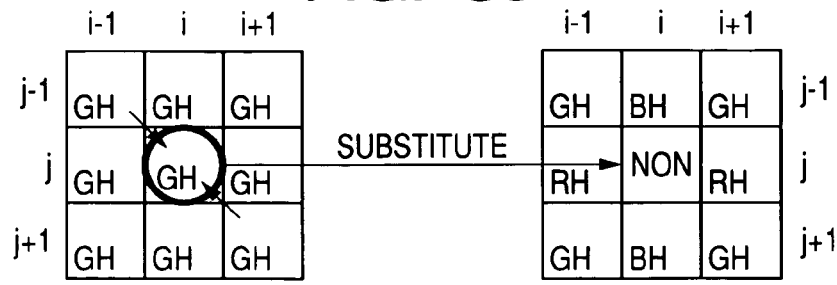
FIG. 30 is a diagram of the relation between a nonexistent pixel and pixel-corresponding segments of the high-frequency green signal which are adopted for the nonexistent pixel when a highest-correlation direction is a 135-degree oblique direction.

With reference to FIG. 27, when the highest-correlation direction notified by the correlation-direction detecting section 18 is the vertical direction, the high-frequency component interpolating section 19 adopts the pixel-corresponding segment BH(i, j) of the high-frequency blue signal BH as a pixel-corresponding segment for the nonexistent pixel position (i, j) of interest. With reference to FIG. 28, when the highest-correlation direction notified by the correlation-direction detecting section 18 is the horizontal direction, the high-frequency component interpolating section 19 adopts the pixel-corresponding segment RH(i, j) of the high-frequency red signal RH as a pixel-corresponding segment for the nonexistent pixel position (i, j) of interest. With reference to FIG. 29, when the highest-correlation direction notified by the correlation-direction detecting section 18 is the 45-degree oblique direction, the high-frequency component interpolating section 19 generates the average of the pixel-corresponding segments GH(i−1, j+1) and GH(i+1, j−1) of the high-frequency green signal GH which correspond to the right-upper and left-lower pixel positions neighboring the nonexistent pixel position (i, j) of interest. Then, the high-frequency component interpolating section 19 adopts the generated average as a pixel-corresponding segment for the nonexistent pixel position (i, j) of interest. With reference to FIG. 30, when the highest-correlation direction notified by the correlation-direction detecting section 18 is the 135-degree oblique direction, the high-frequency component interpolating section 19 generates the average of the pixel-corresponding segments GH(i−1, j−1) and GH(i+1, j+1) of the high-frequency green signal GH which correspond to the left-upper and right-lower pixel positions neighboring the nonexistent pixel position (i, j) of interest. Then, the high-frequency component interpolating section 19 adopts the generated average as a pixel-corresponding segment for the nonexistent pixel position (i, j) of interest.

In this way, the high-frequency component interpolating section 19 assigns an interpolation-based pixel-corresponding signal segment to every nonexistent pixel position "NON" (see FIG. 26). Then, high-frequency component interpolating section 19 combines the segments of the high-frequency red, green, and blue signals RH, GH, and BH for the pixel positions except the nonexistent pixel positions "NON" and the assigned interpolation-based signal segments for the nonexistent pixel positions "NON" to generate the high-frequency interpolation-result signal (the high-frequency composite signal) RGBHI. Specifically, for the pixel positions except the nonexistent pixel positions "NON", the high-frequency component interpolating section 19 directly uses the high-frequency red, green, and blue signals RH, GH, and BH as the high-frequency interpolation-result signal RGBHI. On the other hand, for the nonexistent pixel positions "NON", the high-frequency component interpolating section 19 uses the assigned interpolation-based signal segments as the high-frequency interpolation-result signal RGBHI.

Preferably, the correlation-direction detecting section 18 and the high-frequency component interpolating section 19 are formed by a computer having a combination of an input/output port, a CPU, a ROM, and a RAM. In this case, the correlation-direction detecting section 18 and the high-frequency component interpolating section 19 operate in accordance with a control program (a computer program) stored in the ROM.

Figure 31:
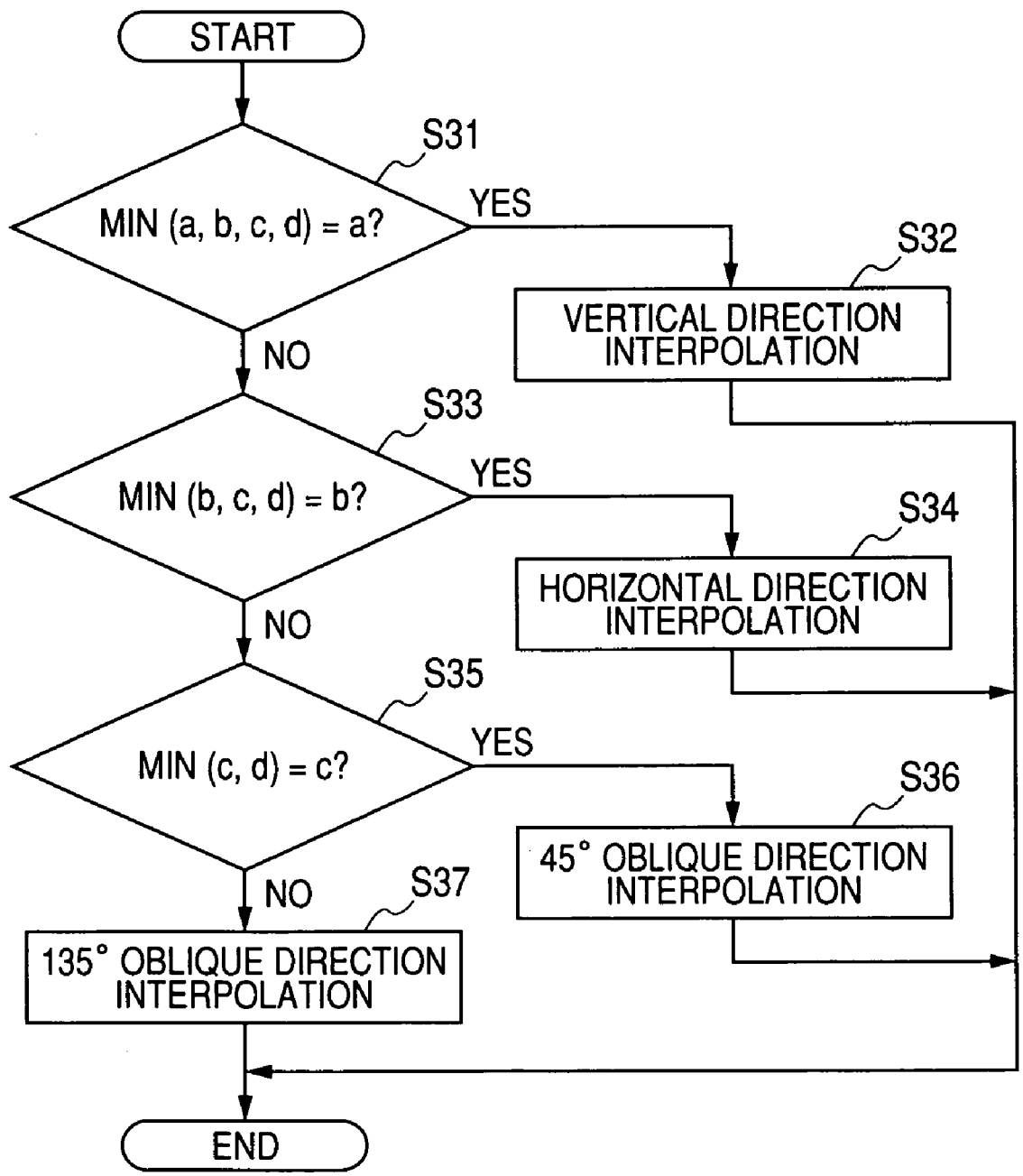
FIG. 31 is a flowchart of a segment of a control program for a computer forming a correlation-direction detecting section and a high-frequency component interpolating section in FIG. 13.

FIG. 31 is a flowchart of a segment of the control program which is executed for every nonexistent pixel position (i, j). As shown in FIG. 31, a first step S31 of the program segment decides whether or not the minimum among the standard deviations "a", "b", "c", and "d" is the standard deviation "a". When the minimum among the standard deviations "a", "b", "c", and "d" is the standard deviation "a", the program advances from the step S31 to a step S32. Otherwise, the program advances from the step S31 to a step S33.

The step S32 concludes that the correlation along the vertical direction is the highest among the correlations along the four directions. The step S32 adopts the pixel-corresponding segment BH(i, j) of the high-frequency blue signal BH as a pixel-corresponding segment for the nonexistent pixel position (i, j).

The step S33 decides whether or not the minimum among the standard deviations "b", "c", and "d" is the standard deviation "b". When the minimum among the standard deviations "b", "c", and "d" is the standard deviation "b", the program advances from the step S33 to a step S34. Otherwise, the program advances from the step S33 to a step S35.

The step S34 concludes that the correlation along the horizontal direction is the highest among the correlations along the four directions. The step S34 adopts the pixel-corresponding segment RH(i, j) of the high-frequency red signal RH as a pixel-corresponding segment for the nonexistent pixel position (i, j).

The step S35 decides whether or not the minimum among the standard deviations "c" and "d" is the standard deviation "c". When the minimum among the standard deviations "c" and "d" is the standard deviation "c", the program advances from the step S35 to a step S36. Otherwise, the program advances from the step S35 to a step S37.

The step S36 concludes that the correlation along the 45-degree oblique direction is the highest among the correlations along the four directions. The step S36 generates the average of the pixel-corresponding segments GH(i−1, j+1) and GH(i+1, j−1) of the high-frequency green signal GH which correspond to the right-upper and left-lower pixel positions neighboring the nonexistent pixel position (i, j). Then, the step S36 adopts the generated average as a pixel-corresponding segment for the nonexistent pixel position (i, j).

The step S37 concludes that the correlation along the 135-degree oblique direction is the highest among the correlations along the four directions. The step S37 generates the average of the pixel-corresponding segments GH(i−1, j−1) and GH(i+1, j+1) of the high-frequency green signal GH which correspond to the left-upper and right-lower pixel positions neighboring the nonexistent pixel position (i, j). Then, the step S37 adopts the generated average as a pixel-corresponding segment for the nonexistent pixel position (i, j).

After the steps S32, S34, S36, and S37, the current execution cycle of the program segment ends.

Figure 32:
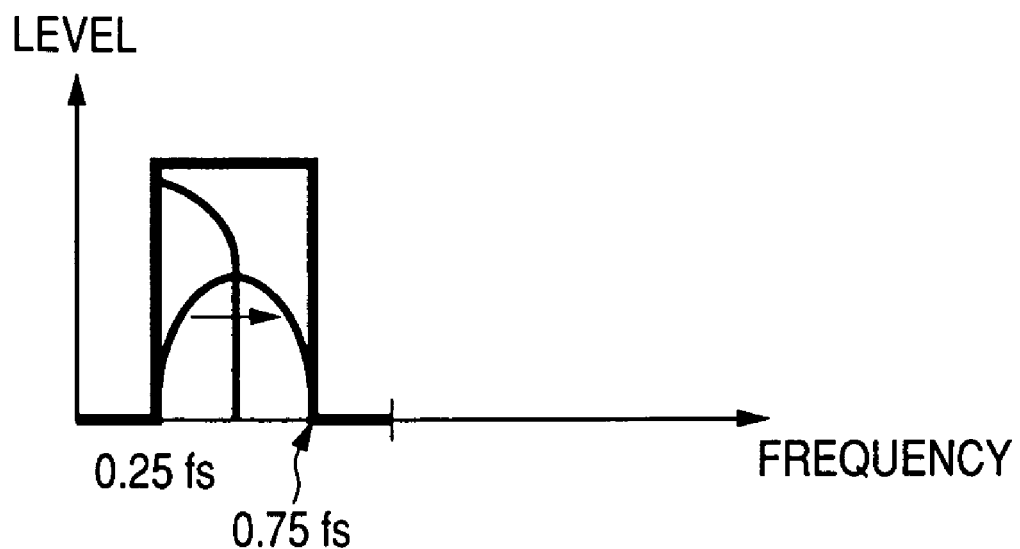
FIG. 32 is a diagram showing an example of the frequency spectrum of a high-frequency interpolation-result signal generated by the high-frequency component interpolating section in FIG. 13.
Figure 33:
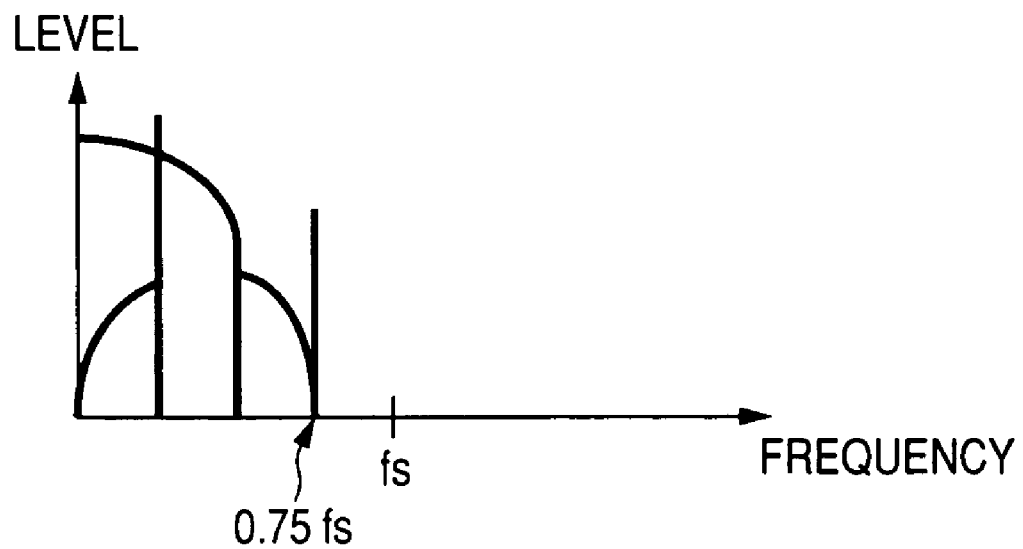
FIG. 33 is a diagram showing an example of the frequency spectrum of each of high-definition component video signals generated by a high-frequency component adding section in FIG. 13.

The high-frequency component adding section 20 receives the high-frequency interpolation-result signal RGBHI from the high-frequency component interpolating section 19. The high-frequency component adding section 20 receives the low-frequency red, green, and blue signals RL, GL, and BL from the low-frequency component extracting section 16. The high-frequency interpolation-result signal RGBHI has a frequency spectrum such as shown in FIG. 32. Each of the low-frequency red, green, and blue signals RL, GL, and BL has a frequency spectrum such as shown in FIG. 24. The high-frequency component adding section 20 combines the low-frequency red signal RL and the high-frequency interpolation-result signal RGBHI into a high-definition red signal R(HD). In addition, the high-frequency component adding section 20 combines the low-frequency green signal GL and the high-frequency interpolation-result signal RGBHI into a high-definition green signal G(HD). Furthermore, the high-frequency component adding section 20 combines the low-frequency blue signal BL and the high-frequency interpolation-result signal RGBHI into a high-definition blue signal B(HD). Each of the high-definition component video signals R(HD), G(HD), and B(HD) has a frequency spectrum such as shown in FIG. 33. The maximum frequency of each of the high-definition component video signals R(HD), G(HD), and B(HD) is "0.75 fs" equal to "0.5 fs" multiplied by 1.5. The higher maximum frequency causes a higher video definition. The signal combining actions by the high-frequency component adding section 20 are implemented according to the following equations.

$$R(HD)=RL+RGBHI,\ G(HD)=GL+RGBHI,\\ B(HD)=BL+RGBHI \quad (6)$$

The high-frequency component adding section 20 outputs a set of the high-definition component video signals R(HD), G(HD), and B(HD).

A high video definition is provided by the high-definition component video signals R(HD), G(HD), and B(HD) although only the three solid-state image sensors 12R, 12G, and 12B each having a relatively small number of photosensor pixels are used. Not only higher video definitions along the horizontal and vertical directions but also higher video definitions along the oblique directions are attained. Furthermore, the accuracy of interpolation with respect to high-frequency signal components is increased. Therefore, it is possible to attain a high video definition comparable to that provided in cases where four solid-state image sensors are used. The interpolation with respect to the high-frequency signal components is implemented through the calculation of the standard deviations along the different directions and the detection of the direction in which the highest correlation occurs in response to the calculated standard deviations.

Second Embodiment

A second embodiment of this invention is similar to the first embodiment thereof except for points mentioned hereafter. The second embodiment of this invention is designed to increase the accuracy of the detection of the highest-correlation direction by the correlation-direction detecting section 18.

Figures 34, 35, 36, 37, 38:
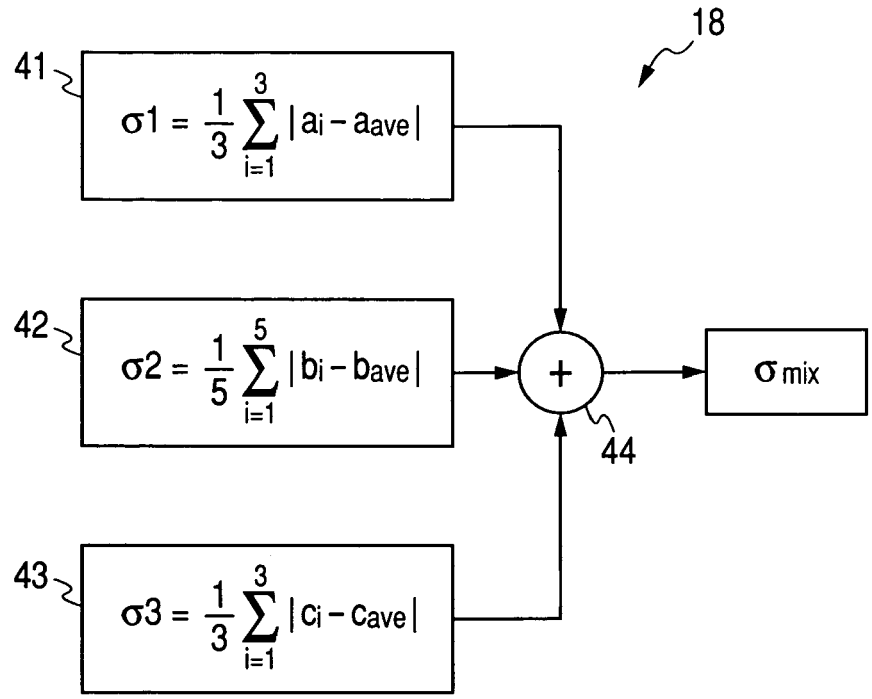
FIG. 34 is a block diagram of a portion of a correlation-direction detecting section in an imaging apparatus according to a second embodiment of this invention.
FIG. 35 is a diagram of an arrangement of pixels corresponding to signal segments used for the calculation of a standard deviation along a vertical direction in the second embodiment of this invention.
FIG. 36 is a diagram of an arrangement of pixels corresponding to signal segments used for the calculation of a standard deviation along a horizontal direction in the second embodiment of this invention.
FIG. 37 is a diagram of an arrangement of pixels corresponding to signal segments used for the calculation of a standard deviation along a 45-degree oblique direction in the second embodiment of this invention.
FIG. 38 is a diagram of an arrangement of pixels corresponding to signal segments used for the calculation of a standard deviation along a 135-degree oblique direction in the second embodiment of this invention.

As shown in FIG. 34, the correlation-direction detecting section 18 in the second embodiment of this invention includes standard-deviation calculating sections 41, 42, and 43, and an adding section 44.

With respect to every nonexistent pixel "b3", segments of the high-frequency red, green, and blue signals RH, GH, and BH which correspond to a set of adjacent pixels "a1", "a2", "a3", "b1", "b2", "b3", "b4", "b5", "c1", "c2", and "c3" centered at the nonexistent pixel "b3" are selected as samples for calculating standard deviations along the four directions (the vertical, horizontal, 45-degree oblique, and 135-degree oblique directions).

For the calculation of the standard deviation along the vertical direction, the pixels "a1", "a2", "a3", "b1", "b2", "b3", "b4", "b5", "c1", "c2", and "c3" are arranged in a frame as shown in FIG. 35. In this case, the pixels "b1", "b2", "b3", "b4", and "b5" are in a center vertical line having the nonexistent pixel "b3". The pixels "a1", "a2", and "a3" are in a left vertical line extending adjacently leftward of the center vertical line. The pixels "c1", "c2", and "c3" are in a right vertical line extending adjacently rightward of the center vertical line. For the pixels "b1", "b2", "b3", "b4", and "b5", corresponding segments of the high-frequency blue signal BH are used. For the pixels "a1", "a3", "c1", and "c3", corresponding segments of the high-frequency green signal GH are used. For the pixels "a2" and "c2", corresponding segments of the high-frequency red signal RH are used.

For the calculation of the standard deviation along the horizontal direction, the pixels "a1", "a2", "a3", "b1", "b2", "b3", "b4", "b5", "c", "c2", and "c3" are arranged in a frame as shown in FIG. 36. In this case, the pixels "b1", "b2", "b3", "b4", and "b5" are in a center horizontal line having the nonexistent pixel "b3". The pixels "a1", "a2", and "a3" are in an upper horizontal line extending immediately above the center horizontal line. The pixels "c1", "c2", and "c3" are in a lower horizontal line extending immediately below the center horizontal line. For the pixels "b1", "b2", "b3", "b4", and "b5", corresponding segments of the high-frequency red signal RH are used. For the pixels "a1", "a3", "c1", and "c3", corresponding segments of the high-frequency green signal GH are used. For the pixels "a2" and "c2", corresponding segments of the high-frequency blue signal BH are used.

For the calculation of the standard deviation along the 45-degree oblique direction, the pixels "a1", "a3", "b1", "b2", "b3", "b4", "b5", "c1", "c2", and "c3" are arranged in a frame as shown in FIG. 37. In this case, the pixels "b1", "b2", "b3", "b4", and "b5" are in a center oblique line having the nonexistent pixel "b3". The pixels "a1", "a2", and "a3" are in a left-upper oblique line extending adjacently leftward and upward of the center oblique line. The pixels "c1", "c2", and "c3" are in a right-lower oblique line extending adjacently rightward and downward of the center oblique line. For the pixels "b1", "b2", "b3", "b4", and "b5", corresponding segments of the high-frequency green signal GH are used. For the pixels "a1", "a3", "c1", and "c3", corresponding segments of the high-frequency red signal RH are used. For the pixels "a2" and "c2", corresponding segments of the high-frequency blue signal BH are used.

For the calculation of the standard deviation along the 135-degree oblique direction, the pixels "a1", "a2", "a3", "b1", "b2", "b3", "b4", "b5", "c1", "c2", and "c3" are arranged in a frame as shown in FIG. 38. In this case, the pixels "b1", "b2", "b3", "b4", and "b5" are in a center oblique line having the nonexistent pixel "b3". The pixels "a1", "a2", and "a3" are in a right-upper oblique line extending adjacently rightward and upward of the center oblique line. The pixels "c1", "c2", and "c3" are in a left-lower oblique line extending adjacently leftward and downward of the center oblique line. For the pixels "b1", "b2", "b3", "b4", and "b5", corresponding segments of the high-frequency green signal GH are used. For the pixels "a1", "a3", "c1", and "c3", corresponding segments of the high-frequency red signal RH are used. For the pixels "a2" and "c2", corresponding segments of the high-frequency blue signal BH are used.

The standard-deviation calculating section 41 computes each "σ1" of the standard deviations of the selected pixel-corresponding segments of the high-frequency red, green, and blue signals RH, GH, and BH according to the following equation.

$$\sigma 1 = \frac{1}{3}\sum_{i=1}^{3}|a_i - a_{ave}|$$

where "$a_i$" denotes the value of each of the signal segments corresponding to the pixels "a1", "a2", and "a3", and "$a_{ave}$" denotes the mean of the values of the signal segments corresponding to the pixels "a1", "a2", and "a3".

The standard-deviation calculating section 42 computes each "σ2" of the standard deviations of the values of the selected pixel-corresponding segments of the high-frequency red, green, and blue signals RH, GH, and BH according to the following equation.

$$\sigma 2 = \frac{1}{5}\sum_{i=1}^{5}|b_i - b_{ave}|$$

where "$b_i$" denotes the value of each of the signal segments corresponding to the pixels "b1", "b2", "b3", "b4", and "b5", and "$b_{ave}$" denotes the mean of the values of the signal segments corresponding to the pixels "b1", "b2", "b3", "b4", and "b5".

The standard-deviation calculating section 43 computes each "σ3" of the standard deviations of the selected pixel-corresponding segments of the high-frequency red, green, and blue signals RH, GH, and BH according to the following equation.

$$\sigma 3 = \frac{1}{3}\sum_{i=1}^{3}|c_i - c_{ave}|$$

where "$c_i$" denotes the value of each of the signal segments corresponding to the pixels "c1", "c2", and "c3", and "$c_{ave}$" denotes the mean of the values of the signal segments corresponding to the pixels "c1", "c2", and "c3".

The adding section 44 adds the computed standard deviations "σ1", "σ2", and "σ3" to obtain a total deviation "$\sigma_{mix}$" for each of the four directions (the vertical direction, the horizontal direction, the 45-degree oblique direction, and the 135-degree oblique direction). The correlation-direction detecting section 18 compares the obtained total deviations "$\sigma_{mix}$" for the four directions to detect the smallest one thereamong. The correlation-direction detecting section 18 identifies which of the four directions the smallest total deviation "$\sigma_{mix}$" relates to. The correlation-direction detecting section 18 concludes that the highest correlation occurs in the identified direction. In this way, the correlation-direction detecting section 18 detects the highest-correlation direction.

Each of the total deviations "$\sigma_{mix}$" is equal to the sum of the standard deviations "σ1", "σ2", and "σ3" related to the three adjacent lines. The use of such total deviations increases the accuracy of the detection of the direction along which the highest correlation occurs.

Third Embodiment

A third embodiment of this invention is similar to the first or second embodiment thereof except for design changes mentioned hereafter.

According to the third embodiment of this invention, the optical position of the image sensor 12R relative to the incident light slightly differs from that of the image sensor 12G such that the photosensor pixels in the image sensors 12R and 12G are staggered at only vertical intervals equal to half the vertical pixel pitch Py or only horizontal intervals equal to half the horizontal pixel pitch Px. Alternatively, the photosensor pixels in the image sensors 12R and 12G may be staggered at vertical intervals equal to half the vertical pixel pitch Py and also horizontal intervals equal to half the horizontal pixel pitch Px. The optical position of the image sensor 12B relative to the incident light slightly differs from that of the image sensor 12G such that the photosensor pixels in the image sensors 12B and 12G are staggered at only horizontal intervals equal to half the horizontal pixel pitch Px or only vertical intervals equal to half the vertical pixel pitch Py. Alternatively, the photosensor pixels in the image sensors 12B and 12G may be staggered at horizontal intervals equal to half the horizontal pixel pitch Px and also vertical intervals equal to half the vertical pixel pitch Py. The optical positions of photosensor pixels in the image sensor 12B do not overlap those of photosensor pixels in the image sensor 12R.

What is claimed is:

1. An imaging apparatus comprising:
   a color-separation optical system for separating incident light into green, red, and blue light beams;
   a first solid-state image sensor receiving the green light beam from the color-separation optical system and including a plurality of photosensor pixels arranged at prescribed pixel pitches along horizontal and vertical directions, the first solid-state image sensor changing the received green light beam into an analog G signal through photoelectric conversion implemented by the photosensor pixels therein;
   a second solid-state image sensor receiving the red light beam from the color-separation optical system and including a plurality of photosensor pixels, the second solid-state image sensor changing the received red light beam into an analog R signal through photoelectric conversion implemented by the photosensor pixels therein, wherein the photosensor pixels in the second solid-state image sensor are different in optical position from the photosensor pixels in the first solid-state image sensor by a distance corresponding to half the prescribed pixel pitch along at least one of the horizontal and vertical directions;
   a third solid-state image sensor receiving the blue light beam from the color-separation optical system and including a plurality of photosensor pixels, the third solid-state image sensor changing the received blue light beam into an analog B signal through photoelectric conversion implemented by the photosensor pixels therein, wherein the photosensor pixels in the third solid-state image sensor are different in optical position from the photosensor pixels in the first solid-state image sensor by a distance corresponding to half the prescribed pixel pitch along at least one of the horizontal and vertical directions, and wherein the optical positions of the photosensor pixels in the third solid-state image sensor are out of overlap with the optical positions of the photosensor pixels in the second solid-state image sensor;
   first means for converting the analog G, R, and B signals generated by the first, second, and third solid-state image sensors into digital G, R, and B signals, respectively;
   second means for implementing two-dimensional interpolation in response to the digital G signal to generate signal segments representing pixels between pixels represented by the digital G signal, and thereby converting the digital G signal into an interpolation-result signal GI;
   third means for implementing two-dimensional interpolation in response to the digital R signal to generate signal segments representing pixels between pixels represented by the digital R signal, and thereby converting the digital R signal into an interpolation-result signal RI;
   fourth means for implementing two-dimensional interpolation in response to the digital B signal to generate signal segments representing pixels between pixels represented by the digital B signal, and thereby converting the digital B signal into an interpolation-result signal BI;
   a first two-dimensional low pass filter for extracting low-frequency components GL, which are defined in a two-dimensional space, from the interpolation-result signal GI;
   a second two-dimensional low pass filter for extracting low-frequency components RL, which are defined in a two-dimensional space, from the interpolation-result signal RI;
   a third two-dimensional low pass filter for extracting low-frequency components BL, which are defined in a two-dimensional space, from the interpolation-result signal BI;
   fifth means for subtracting the low-frequency components GL from the interpolation-result signal GI to generate high-frequency components GH;
   sixth means for subtracting the low-frequency components RL from the interpolation-result signal RI to generate high-frequency components RH;
   seventh means for subtracting the low-frequency components BL from the interpolation-result signal BI to generate high-frequency components BH;
   eighth means for calculating standard deviations of portions of the high-frequency components GH, RH, and BH along respective predetermined directions, wherein the portions of the high-frequency components GH, RH, and BH represent a prescribed number of pixels including an interpolation pixel located at a position corresponding to none of the photosensor pixels in the first, second, and third solid-state image sensors;
   ninth means for detecting the smallest one among the standard deviations calculated by the eighth means, and labeling the predetermined direction relating to the detected smallest standard deviation as a highest-correlation direction in which the highest correlation occurs;
   tenth means for implementing interpolation in response to portions of the high-frequency components GH, RH, and BH which correspond to the highest-correlation direction to generate a high-frequency interpolation-result signal RGBHI for the interpolation pixel and also other pixels; and
   eleventh means for combining the low-frequency components GL, RL, and BL with the high-frequency interpolation-result signal RGBHI to generate high-definition green, red, and blue signals G(HD), R(HD), and B(HD).

2. An imaging apparatus as recited in claim 1, wherein the eighth means comprises:
   means for calculating first, second, and third components of each of the standard deviations; and
   means for combining the calculated first, second, and third components to obtain each of the standard deviations;
   wherein the calculated first component is equal to a standard deviation of portions of the high-frequency components GH, RH, and BH which represent pixels in a first line passing through the interpolation pixel and parallel to each of the predetermined directions, wherein the calculated second component is equal to a standard deviation of portions of the high-frequency components GH, RH, and BH which represent pixels in a second line adjacent and parallel to the first line, and wherein the calculated third component is equal to a standard deviation of portions of the high-frequency components GH, RH, and BH which represent pixels in a third line adjacent and parallel to the first line.

3. A method of processing a video signal in an imaging apparatus including a color-separation optical system and first, second, and third solid-state imaging sensors, the color-separation optical system separating incident light into green, red, and blue light beams, the first solid-state image sensor receiving the green light beam from the color-separation optical system and including a plurality of photosensor pixels arranged at prescribed pixel pitches along horizontal and vertical directions, the first solid-state image sensor changing the received green light beam into an analog G signal through photoelectric conversion implemented by the photosensor pixels therein, the second solid-state image sensor receiving the red light beam from the color-separation optical system and including a plurality of photosensor pixels, the second solid-state image sensor changing the received red light beam into an analog R signal through photoelectric conversion implemented by the photosensor pixels therein, wherein the photosensor pixels in the second solid-state image sensor are different in optical position from the photosensor pixels in the first solid-state image sensor by a distance corresponding to half the prescribed pixel pitch along at least one of the horizontal and vertical directions, the third solid-state image sensor receiving the blue light beam from the color-separation optical system and including a plurality of photosensor pixels, the third solid-state image sensor changing the received blue light beam into an analog B signal through photoelectric conversion implemented by the photosensor pixels therein, wherein the photosensor pixels in the third solid-state image sensor are different in optical position from the photosensor pixels in the first solid-state image sensor by a distance corresponding to half the prescribed pixel pitch along at least one of the horizontal and vertical directions, and wherein the optical positions of the photosensor pixels in the third solid-state image sensor are out of overlap with the optical positions of the photosensor pixels in the second solid-state image sensor, the method comprising the steps of:

converting the analog G, R, and B signals generated by the first, second, and third solid-state image sensors into digital G, R, and B signals, respectively;

implementing two-dimensional interpolation in response to the digital G signal to generate signal segments representing pixels between pixels represented by the digital G signal, and thereby converting the digital G signal into an interpolation-result signal GI;

implementing two-dimensional interpolation in response to the digital R signal to generate signal segments representing pixels between pixels represented by the digital R signal, and thereby converting the digital R signal into an interpolation-result signal RI;

implementing two-dimensional interpolation in response to the digital B signal to generate signal segments representing pixels between pixels represented by the digital B signal, and thereby converting the digital B signal into an interpolation-result signal BI;

extracting low-frequency components GL, which are defined in a two-dimensional space, from the interpolation-result signal GI through the use of a first two-dimensional low pass filter;

extracting low-frequency components RL, which are defined in a two-dimensional space, from the interpolation-result signal RI through the use of a second two-dimensional low pass filter;

extracting low-frequency components BL, which are defined in a two-dimensional space, from the interpolation-result signal BI through the use of a third two-dimensional low pass filter;

subtracting the low-frequency components GL from the interpolation-result signal GI to generate high-frequency components GH;

subtracting the low-frequency components RL from the interpolation-result signal RI to generate high-frequency components RH;

subtracting the low-frequency components BL from the interpolation-result signal BI to generate high-frequency components BH;

calculating standard deviations of portions of the high-frequency components GH, RH, and BH along respective predetermined directions, wherein the portions of the high-frequency components GH, RH, and BH represent a prescribed number of pixels including an interpolation pixel located at a position corresponding to none of the photosensor pixels in the first, second, and third solid-state image sensors;

detecting the smallest one among the calculated standard deviations, and labeling the predetermined direction relating to the detected smallest standard deviation as a highest-correlation direction in which the highest correlation occurs;

implementing interpolation in response to portions of the high-frequency components GH, RH, and BH which correspond to the highest-correlation direction to generate a high-frequency interpolation-result signal RGBHI for the interpolation pixel and other pixels; and combining the low-frequency components GL, RL, and BL with the high-frequency interpolation-result signal RGBHI to generate high-definition green, red, and blue signals G(HD), R(HD), and B(HD).

4. A method as recited in claim 3, wherein the step of calculating the standard deviations comprises:

calculating first, second, and third components of each of the standard deviations; and combining the calculated first, second, and third components to obtain each of the standard deviations;

wherein the calculated first component is equal to a standard deviation of portions of the high-frequency components GH, RH, and BH which represent pixels in a first line passing through the interpolation pixel and parallel to each of the predetermined directions, wherein the calculated second component is equal to a standard deviation of portions of the high-frequency components GH, RH, and BH which represent pixels in a second line adjacent and parallel to the first line, and wherein the calculated third component is equal to a standard deviation of portions of the high-frequency components GH, RH, and BH which represent pixels in a third line adjacent and parallel to the first line.

5. An imaging apparatus comprising:

means for separating an R signal into a high-frequency-component signal RH and a low-frequency-component signal RL;

means for separating a G signal into a high-frequency-component signal GH and a low-frequency-component signal GL;

means for separating a B signal into a high-frequency-component signal BH and a low-frequency-component signal BL;

wherein the high-frequency-component signals RH, GH, and BH are divided into portions representing respective pixels in every frame;

means for calculating standard deviations of respective sets of selected ones among the portions of the high-frequency-component signals RH, GH, and BH, wherein each of the sets represents selected pixels including each prescribed pixel, and the selected pixels are in different predetermined directions related to the respective calculated standard deviations and passing the prescribed pixel;

means for detecting the smallest one among the calculated standard deviations;

means for identifying, among the predetermined directions, one related to the detected smallest standard deviation;

means for using the high-frequency-component signals RH, GH, and BH as a high-frequency composite signal RGBHI for pixels except the prescribed pixel, selecting one from the high-frequency-component signals RH, GH, and BH in response to the identified direction, and generating a high-frequency composite signal RGBHI for the prescribed pixel in response to the selected one of the high-frequency-component signals RH, GH, and BH; and means for combining the low-frequency-component signals RL, GL, and BL with the high-frequency composite signal RGBHI for the prescribed pixel and the other pixels to generate a high-definition red, green, and blue signals R(HD), G(HD), and B(HD).

* * * * *